(12) United States Patent
Wang et al.

(10) Patent No.: US 11,516,734 B2
(45) Date of Patent: Nov. 29, 2022

(54) CONTROL METHOD AND RELATED DEVICE

(71) Applicant: HUAWEI TECHNOLOGIES CO., LTD., Guangdong (CN)

(72) Inventors: Junwei Wang, Shenzhen (CN); Meng Deng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 17/186,836

(22) Filed: Feb. 26, 2021

(65) Prior Publication Data

US 2021/0185606 A1 Jun. 17, 2021

Related U.S. Application Data

(63) Continuation of application No. PCT/CN2018/103652, filed on Aug. 31, 2018.

(51) Int. Cl.
*G06F 1/32* (2019.01)
*H04W 52/02* (2009.01)
(Continued)

(52) U.S. Cl.
CPC ........ *H04W 52/0206* (2013.01); *H04B 7/046* (2013.01); *H04W 76/28* (2018.02)

(58) Field of Classification Search
None
See application file for complete search history.

(56) References Cited

U.S. PATENT DOCUMENTS 5,930,706 A   7/1999 Raith
9,037,198 B2* 5/2015 Banerjea ........... H04W 52/0229
                                              455/343.1
(Continued)

FOREIGN PATENT DOCUMENTS

CN   101888624 A   11/2010
CN   102340854 A    2/2012
(Continued)

OTHER PUBLICATIONS

Office Action issued in Chinese Application No. 201880096744.4 dated Nov. 3, 2021, 5 pages.
(Continued)

*Primary Examiner* — Sithu Ko
(74) *Attorney, Agent, or Firm* — Fish & Richardson P.C.

(57) ABSTRACT

The present disclosure relates to control methods and devices. One example method is applied for a terminal device, and the terminal device comprises a radio frequency processing circuit, the radio frequency processing circuit comprising a plurality of radio frequency channels. The method comprises determining low power consumption state information of the carrier based on precoding information and duration information, where the low power consumption state information comprises a target radio frequency channel and a duration time for scheduling the target radio frequency channel, a data sequence mapped to the target radio frequency channel being all-zero, and sending control information to the radio frequency processing circuit, where the control information is used to control the target radio frequency channel to be in a low power consumption state, and the low power consumption state comprises a disabled state or a dormant state.

20 Claims, 7 Drawing Sheets

(51) Int. Cl.
*H04W 76/28* (2018.01)
*H04B 7/0456* (2017.01)

(56) References Cited

U.S. PATENT DOCUMENTS

| | | | |
|---|---|---|---|
| 10,433,326 B2* | 10/2019 | Zhang | H04W 72/1257 |
| 2008/0101393 A1* | 5/2008 | Noumi | H04L 47/283 |
| | | | 370/401 |
| 2017/0359849 A1* | 12/2017 | Zhang | H04W 72/1257 |
| 2018/0054218 A1* | 2/2018 | Qian | H04L 5/005 |
| 2018/0124749 A1* | 5/2018 | Park | H04L 27/0006 |
| 2018/0145853 A1 | 5/2018 | Nguyen et al. | |
| 2018/0175975 A1* | 6/2018 | Um | H04W 16/14 |
| 2018/0191547 A1* | 7/2018 | Mukherjee | H04L 27/2692 |
| 2021/0022104 A1* | 1/2021 | Sundstrom | H04W 52/0287 |
| 2021/0152976 A1* | 5/2021 | Daoura | H04W 52/0229 |

FOREIGN PATENT DOCUMENTS

| | | |
|---|---|---|
| CN | 102421134 A | 4/2012 |
| CN | 102577528 A | 7/2012 |
| CN | 101674642 B | 4/2014 |
| CN | 106162840 A | 11/2016 |
| CN | 106341169 A | 1/2017 |
| CN | 106817156 A | 6/2017 |
| WO | 2010051728 A1 | 5/2010 |

OTHER PUBLICATIONS

Extended European Search Report issued in European Application No. 18931930.4 dated Aug. 2, 2021, 9 pages.
PCT International Search Report and Written Opinion issued in International Application No. PCT/CN2018/103652 dated May 13, 2019, 15 pages (with English translation).

* cited by examiner

| Terminal device | | | | |
|---|---|---|---|---|
| Control device | Radio frequency processing module | Digital/analog conversion module | Resource mapping module | Symbol generation module |

101: Determine, for each of one or more carriers, low power consumption state information of the carrier based on precoding information and duration information of the carrier 102: Send control information to the radio frequency processing module based on the low power consumption state information of each carrier, where the control information is used to control one or more of a plurality of radio frequency channels to be in a low power consumption state, and the low power consumption state includes a disabled state or a dormant state 103: Send control information to the digital/analog conversion module based on the low power consumption state information of each carrier, where the control information is used to control one or more of a plurality of digital/analog conversion units to be in a low power consumption state, and the low power consumption state includes a disabled state or a dormant state 104: Send control information to the resource mapping module based on the low power consumption state information of each carrier, where the control information is used to control one or more of a plurality of resource mapping units to be in a low power consumption state, and the low power consumption state includes a disabled state or a dormant state 105: Send control information to the symbol generation module based on the low power consumption state information of each carrier, where the control information is used to control one or more of a plurality of symbol generation units to be in a low power consumption state, and the low power consumption state includes a disabled state or a dormant state

FIG. 6

CONTROL METHOD AND RELATED DEVICE

CROSS-REFERENCE TO RELATED APPLICATIONS

This application is a continuation of International Application No. PCT/CN2018/103652, filed on Aug. 31, 2018, the disclosure of which is hereby incorporated by reference in its entirety.

TECHNICAL FIELD

This application relates to the field of communications technologies, and in particular, to a control method and a related device.

BACKGROUND

Currently, a massive multiple-input multiple-output (Massive MIMO) system can significantly improve spectral efficiency through massive antennas. A quantity of codewords obtained after channel coding is performed on a transport block does not match a quantity of transmit antennas in the MIMO system. Therefore, to map codewords to different antennas for sending, serial-to-parallel conversion is completed through layer mapping and precoding.

Precoded data flows are allocated to a plurality of antenna ports, so that interference between spatial multiplexing data flows can be reduced or controlled. However, it is found through research that a terminal device consumes a large amount of electric energy during multiple-input multiple-output communication. Therefore, how to reduce power consumption of the terminal device is an urgent problem to be resolved, especially when electric energy of the terminal device is limited.

SUMMARY

This application provides a control method and a related device, to reduce power consumption of the device.

According to a first aspect, this application provides a terminal device. The terminal device includes a baseband processing module and a radio frequency processing module, and the radio frequency processing module includes a plurality of radio frequency channels.

The baseband processing module is configured to determine, for each of one or more carriers, low power consumption state information of the carrier based on precoding information and duration information of the carrier.

The low power consumption state information includes a target radio frequency channel and a start time and an end time for scheduling the target radio frequency channel; the target radio frequency channel is a radio frequency channel corresponding to an all-zero data sequence in a plurality of data sequences that are mapped to the plurality of radio frequency channels after precoding processing is performed on to-be-sent data of the terminal device based on the precoding information; and the start time and the end time are determined based on the duration information.

The baseband processing module is further configured to send control information to the radio frequency processing module based on the low power consumption state information of each carrier.

The radio frequency processing module is configured to control, based on the control information, one or more of the plurality of radio frequency channels to be in a low power consumption state, where the low power consumption state includes a disabled state or a dormant state.

It can be learned that, in the terminal device, the radio frequency processing module may set the one or more of the plurality of radio frequency channels to a disabled state or a dormant state based on the low power consumption state information of the carrier, thereby reducing power consumption of the terminal device.

In this embodiment of this application, the precoding information may be determined in different transmission modes. In a codebook-based transmission mode, the precoding information includes a codebook index number, a quantity of layers, and the like. In a non-codebook-based transmission mode, the precoding information includes a channel measurement result and the like. In an open-loop based transmission mode, the precoding information includes configuration information of a network device, a codebook index number randomly selected by the terminal device based on the configuration information, and the like.

In this embodiment of the present invention, the duration information includes a scheduling slot offset, a scheduling slot number, a start symbol, scheduling duration, and the like. Alternatively, the duration information includes information such as a data sending start time and data sending duration.

In an optional implementation, that the baseband processing module sends control information to the radio frequency processing module based on the low power consumption state information of the carrier is specifically:

sending the control information to the radio frequency processing module based on the target radio frequency channel of the carrier and the start time and the end time for scheduling the target radio frequency channel.

That the radio frequency processing module controls, based on the control information, one or more of the plurality of radio frequency channels to be in a low power consumption state is specifically:

The radio frequency processing module controls the target radio frequency channel to be in a low power consumption state within duration from the start time to the end time.

It can be learned that, in this implementation, the radio frequency processing module sets the target radio frequency channel corresponding to the mapped all-zero data sequence to a low power consumption state within the duration from the start time to the end time. Compared with a prior-art manner in which radio frequency processing further needs to be performed on an all-zero data sequence, this can greatly reduce power consumption of the terminal device.

In another optional implementation, when there are a plurality of carriers, that the baseband processing module sends control information to the radio frequency processing module based on the low power consumption state information of each carrier is specifically:

determining, based on the target radio frequency channel of each carrier and the start time and the end time for scheduling the target radio frequency channel, a duration range and a radio frequency channel corresponding to a mapped data sequence that is all-zero within scheduling duration for all the plurality of carriers; and sending the control information to the radio frequency processing module based on the duration range and the radio frequency channel corresponding to the mapped data sequence that is all-zero within the scheduling duration for all the plurality of carriers.

That the radio frequency processing module controls, based on the control information, one or more of the plurality of radio frequency channels to be in a low power consumption state is specifically:

The radio frequency processing module controls the radio frequency channel corresponding to the mapped data sequence that is all-zero within the scheduling duration for all the plurality of carriers to be in a low power consumption state within the duration range.

It can be learned that, in this implementation, the radio frequency processing module may set the radio frequency channel corresponding to the mapped data sequence that is all-zero within the scheduling duration for all the plurality of carriers to a low power consumption state within the duration range. Compared with the prior art, this can reduce power consumption of the terminal device.

In another embodiment, the terminal device further includes a digital/analog conversion module, and the digital/analog conversion module includes a plurality of digital/analog conversion units.

The low power consumption state information includes a target digital/analog conversion unit and a start time and an end time for scheduling the target digital/analog conversion unit; the target digital/analog conversion unit is a digital/analog conversion unit corresponding to an all-zero data sequence in a plurality of data sequences that are mapped to the plurality of digital/analog conversion units after precoding processing is performed on to-be-sent data of the terminal device based on the precoding information; and the start time and the end time are determined based on the duration information.

The baseband processing module is further configured to send control information to the digital/analog conversion module based on the low power consumption state information of each carrier.

The digital/analog conversion module is configured to control, based on the control information, one or more of the plurality of digital/analog conversion units to be in a low power consumption state, where the low power consumption state includes a disabled state or a dormant state.

It can be learned that, in this embodiment, the digital/analog conversion module may alternatively control, based on the low power consumption state information of the carrier, the one or more digital/analog conversion units to be in a low power consumption state, thereby reducing power consumption of the terminal device.

In an optional implementation, when there are a plurality of carriers, that the baseband processing module sends control information to the digital/analog conversion module based on the low power consumption state information of each carrier is specifically:

determining, based on the target digital/analog conversion unit of each carrier and the start time and the end time for scheduling the target digital/analog conversion unit, a duration range and a digital/analog conversion unit corresponding to a mapped data sequence that is all-zero within scheduling duration for all the plurality of carriers; and sending the control information to the digital/analog conversion module based on the duration range and the digital/analog conversion unit corresponding to the mapped data sequence that is all-zero within the scheduling duration for all the plurality of carriers.

That the digital/analog conversion module controls, based on the control information, one or more of the plurality of digital/analog conversion units to be in a low power consumption state is specifically:

The digital/analog conversion module controls the digital/analog conversion unit corresponding to the mapped data sequence that is all-zero within the scheduling duration for all the plurality of carriers to be in a low power consumption state within the duration range.

It can be learned that, in this implementation, the digital/analog conversion module may set the digital/analog conversion unit corresponding to the mapped data sequence that is all-zero within the scheduling duration for all the plurality of carriers to a low power consumption state within the duration range. Compared with a prior-art manner in which a digital/analog conversion operation is further performed when each data sequence mapped on all carriers is all-zero, this can reduce power consumption of the terminal device.

In another optional implementation, that the baseband processing module sends control information to the digital/analog conversion module based on the low power consumption state information of each carrier is specifically:

sending the control information to the digital/analog conversion module based on the target digital/analog conversion unit of the carrier and the start time and the end time for scheduling the target digital/analog conversion unit.

That the digital/analog conversion module controls, based on the control information, one or more of the plurality of digital/analog conversion units to be in a low power consumption state is specifically:

The digital/analog conversion module controls the target digital/analog conversion unit to be in a low power consumption state within duration from the start time to the end time.

It can be learned that, in this implementation, the digital/analog conversion module may set the digital/analog conversion unit corresponding to the mapped all-zero data sequence to a low power consumption state within the duration from the start time to the end time that correspond to the duration information. Compared with a prior-art manner in which the digital/analog conversion module further needs to process an all-zero data sequence, this can reduce power consumption of the terminal device.

In an optional implementation, the terminal device further includes a resource mapping module, and the resource mapping module includes a plurality of resource mapping units.

The low power consumption state information includes a target resource mapping unit and a start time and an end time for scheduling the target resource mapping unit; the target resource mapping unit is a resource mapping unit corresponding to an all-zero data sequence in a plurality of data sequences that are mapped to the plurality of resource mapping units after precoding processing is performed on to-be-sent data of the terminal device based on the precoding information; and the start time and the end time are determined based on the duration information.

The baseband processing module is further configured to send control information to the resource mapping module based on the low power consumption state information of each carrier.

The resource mapping module is configured to control, based on the control information, one or more of the plurality of resource mapping units to be in a low power consumption state, where the low power consumption state includes a disabled state or a dormant state.

It can be learned that, in this implementation, the resource mapping module may alternatively control, based on the low power consumption state information, the one or more of the plurality of resource mapping units to be in a low power consumption state, thereby reducing power consumption of the terminal device.

In an optional implementation, when there are a plurality of carriers, that the baseband processing module sends control information to the resource mapping module based on the low power consumption state information of each carrier is specifically:

determining, based on the target resource mapping unit of each carrier and the start time and the end time for scheduling the target resource mapping unit, a duration range and a resource mapping unit corresponding to the mapped data sequence that is all-zero within the scheduling duration for all the plurality of carriers; and sending the control information to the resource mapping module based on the duration range and the resource mapping unit corresponding to the mapped data sequence that is all-zero within the scheduling duration for all the plurality of carriers.

That the resource mapping module controls, based on the control information, one or more of the plurality of resource mapping units to be in a low power consumption state is specifically:

The resource mapping module controls the resource mapping unit corresponding to the mapped data sequence that is all-zero within the scheduling duration for all the plurality of carriers to be in a low power consumption state within the duration range.

It can be learned that, in this implementation, the baseband processing module sends the control information to the resource mapping module, so that the resource mapping module can set the resource mapping unit corresponding to the mapped data sequence that is all-zero within the scheduling duration for all the plurality of carriers to a low power consumption state within the duration range. Compared with a prior-art manner in which the resource mapping module further needs to process an all-zero data sequence, this can reduce power consumption of the terminal device.

In another optional implementation, that the baseband processing module sends control information to the resource mapping module based on the low power consumption state information of each carrier is specifically:

sending the control information to the resource mapping module based on the target resource mapping unit of the carrier and the start time and the end time for scheduling the target resource mapping unit.

That the resource mapping module controls, based on the control information, one or more of the plurality of resource mapping units to be in a low power consumption state is specifically:

The resource mapping module controls the target resource mapping unit to be in a low power consumption state within duration from the start time to the end time.

It can be learned that, in this implementation, the resource mapping module may set the resource mapping unit corresponding to the mapped all-zero data sequence to a low power consumption state within the scheduling duration of the carrier. Compared with a prior-art operation that resource mapping further needs to be performed even if a mapped data sequence is all-zero, this can reduce power consumption of the terminal device.

In still another embodiment, the terminal device further includes a symbol generation module, and the symbol generation module includes a plurality of symbol generation units.

The low power consumption state information includes a target symbol generation unit and a start time and an end time for scheduling the target symbol generation unit; the target symbol generation unit is a symbol generation unit corresponding to an all-zero data sequence in a plurality of data sequences that are mapped to the plurality of symbol generation units after precoding processing is performed on to-be-sent data of the terminal device based on the precoding information; and the start time and the end time are determined based on the duration information.

The baseband processing module is further configured to send control information to the symbol generation module based on the low power consumption state information of each carrier.

The symbol generation module is configured to control, based on the control information, one or more of the plurality of symbol generation units to be in a low power consumption state, where the low power consumption state includes a disabled state or a dormant state.

It can be learned that, in this implementation, the baseband processing module may determine the low power consumption state information of each carrier, and send the control information to the symbol generation module based on the low power consumption state information of each carrier, so as to control the one or more of the plurality of symbol generation units to be in a low power consumption state, thereby reducing power consumption of the terminal device.

In an optional implementation, when there are a plurality of carriers, that the baseband processing module sends control information to the symbol generation module based on the low power consumption state information of each carrier is specifically:

determining, based on the target symbol generation unit of each carrier and the start time and the end time for scheduling the target symbol generation unit, a duration range and a symbol generation unit corresponding to the mapped data sequence that is all-zero within the scheduling duration for all the plurality of carriers; and sending the control information to the symbol generation module based on the duration range and the symbol generation unit corresponding to the mapped data sequence that is all-zero within the scheduling duration for all the plurality of carriers.

That the symbol generation module controls, based on the control information, one or more of the plurality of symbol generation units to be in a low power consumption state is specifically:

The symbol generation module controls the symbol generation unit corresponding to the mapped data sequence that is all-zero within the scheduling duration for all the plurality of carriers to be in a low power consumption state within the duration range.

It can be learned that, in this implementation, the baseband processing module may determine, based on the low power consumption information of each carrier, the duration range and the symbol generation unit corresponding to the mapped data sequence that is all-zero within the scheduling duration for all the plurality of carriers, so that the symbol generation module can control the symbol generation unit to be in a low power consumption state within the duration range. Compared with a prior-art manner in which the symbol generation unit further needs to process a signal corresponding to a mapped all-zero data sequence, this can reduce power consumption of the terminal device.

In another optional implementation, that the baseband processing module sends control information to the symbol generation module based on the low power consumption state information of each carrier is specifically:

sending the control information to the symbol generation module based on the target symbol generation unit of the carrier and the start time and the end time for scheduling the target symbol generation unit.

That the symbol generation module controls, based on the control information, one or more of the plurality of symbol generation units to be in a low power consumption state is specifically:

The symbol generation module controls the target symbol generation unit to be in a low power consumption state within duration from the start time to the end time.

It can be learned that, in this implementation, the symbol generation module may set the symbol generation unit corresponding to the mapped all-zero data sequence to a low power consumption state within the duration from the carrier scheduling start time to the carrier scheduling end time. Compared with a prior-art manner in which a signal corresponding to a mapped all-zero data sequence further needs to be processed, this can reduce power consumption of the terminal device.

In addition to the radio frequency channel, the digital/analog conversion unit, the resource mapping unit, and the symbol generation unit described above, another unit can be further set to a low power consumption state, for example, an upsampling unit. It should be noted that a unit that can be set to a low power consumption state is a unit corresponding to a channel corresponding to an all-zero data sequence mapped after the baseband processing module performs precoding processing. In other words, after the baseband processing module performs precoding processing on to-be-sent data, if data sequences mapped to all channels include an all-zero data sequence, some or all modules or units involved in a subsequent processing procedure included in a channel corresponding to the all-zero data sequence may be set to a low power consumption state. An example in which some or all of a resource mapping unit, a symbol generation unit, a digital/analog conversion unit, and a radio frequency channel corresponding to a channel may be set to a low power consumption state based on whether a data sequence obtained after precoding processing is all-zero is used in this embodiment of the present invention. This is not limited in this embodiment of the present invention.

For the plurality of carriers, precoding matrices corresponding to the carriers are different, and data sequences mapped to all channels may also be different. Therefore, only a channel corresponding to an all-zero data sequence mapped within scheduling duration of all the carriers can be set to a low power consumption state.

In conclusion, this application provides the terminal device, so that some or all units corresponding to a channel corresponding to an all-zero data sequence mapped after precoding processing can be set to a low power consumption state based on the precoding information and the duration information of each carrier. Compared with a prior-art manner in which related processing needs to be performed even if a data sequence mapped to a channel is all-zero, this can reduce power consumption of the terminal device.

A channel corresponding to an all-zero data sequence in a plurality of data sequences mapped after precoding processing may be determined in the following optional implementations. In an optional implementation, a specific data sequence that is obtained after precoding processing and that is all-zero or is less than a preset threshold is learned based on the precoding information, and some or all units corresponding to a channel for transmitting the data are set to a low power consumption state. For example, a precoding matrix is determined based on the precoding information, and a channel corresponding to an all-zero row or corresponding to a row in which each piece of row data is less than the preset threshold in the precoding matrix is a channel for transmitting data in a data sequence that is all-zero or is less than the preset threshold. For another example, a low power consumption state indication table corresponding to the precoding information is determined based on the precoding information, and a channel corresponding to a row whose power consumption state value is "true" in the low power consumption state indication table is a channel for transmitting data in a data sequence that is all-zero or is less than the preset threshold. In another optional implementation, data sequences that are mapped to all channels after precoding processing need to be obtained to find a channel that can be set to a low power consumption state and that is used for transmitting data in a data sequence that is all-zero or is less than a preset threshold.

In this embodiment of this application, when the baseband processing module sends the control information to one or more of the resource mapping module, the symbol generation module, the digital/analog conversion module, and the radio frequency processing module, the control information is used to control a unit or a radio frequency channel corresponding to an all-zero data sequence mapped within scheduling duration of one or more carriers to be in a low power consumption state. Therefore, the control information may be implemented in a plurality of implementations. For example, the control information may include a low power consumption command and a non-low power consumption command. In this case, at a start time of a duration range in which a mapped data sequence is all-zero, the baseband processing module sends the low power consumption command to some or all of the foregoing modules; and at an end time of the duration range in which the mapped data sequence is all-zero, the baseband processing module sends the non-low power consumption command to some or all of the foregoing modules, so that one or more units in the some or all of the foregoing modules are in a low power consumption state. For another example, the control information may be a switching instruction. In this case, at an end time of a duration range in which a mapped data sequence is all-zero, the baseband processing module sends a switching instruction, so that one or more units in some or all of the foregoing modules are in a non-low power consumption state; and at a start time of the duration range in which the mapped data sequence is all-zero, the baseband processing module sends a switching instruction, so that one or more units in the some or all of the foregoing modules are in a low power consumption state. For another example, the control information may be low power consumption control information. In this case, the baseband processing module may send the low power consumption control information to some or all of the foregoing modules based on the low power consumption state information. The low power consumption control information includes a start time and an end time at which a mapped data sequence is all-zero, and a control command corresponding to the start time and the end time. The control command may be a low power consumption control command, so that the some or all of the foregoing modules are in a low power consumption state within duration from the start time to the end time. Optionally, the control information may be implemented in another optional implementation. This is not limited in this embodiment of the present invention.

In an optional implementation, that the baseband processing module determines, for each of one or more carriers, low power consumption state information of the carrier based on precoding information and duration information of the carrier may be specifically:

for each of the one or more carriers, the baseband processing module determines a precoding matrix of the carrier based on the precoding information of the carrier, and determines the target radio frequency channel, the target resource mapping unit, the target digital/analog conversion unit, and/or the target symbol generation unit based on an all-zero row in the precoding matrix of the carrier.

In another optional implementation, that the baseband processing module determines, for each of one or more carriers, low power consumption state information of the carrier based on precoding information and duration information of the carrier may be specifically:

The baseband processing module determines the target radio frequency channel, the target resource mapping unit, the target digital/analog conversion unit, and/or the target symbol generation unit based on a low power consumption state indication table corresponding to the precoding information.

The low power consumption state indication table stores a correspondence between each piece of precoding information and a power consumption state value. The power consumption state value includes "true" and "false". If the power consumption state value is "true", it indicates that a unit and/or a radio frequency channel in a corresponding channel may be in a disabled state or a dormant state; or if the power consumption state value is "false", it indicates that a unit and/or a radio frequency channel in a corresponding channel may be in a non-low power consumption state such as a working state.

According to a second aspect, this application further provides a control method. The control method may be applied to a terminal device, and the method includes:

determining, for each of one or more carriers, low power consumption state information of the carrier based on precoding information and duration information of the carrier, where the low power consumption state information includes a target radio frequency channel and a start time and an end time for scheduling the target radio frequency channel; the target radio frequency channel is a radio frequency channel corresponding to an all-zero data sequence in a plurality of data sequences that are mapped to the plurality of radio frequency channels after precoding processing is performed on to-be-sent data of the terminal device based on the precoding information; and the start time and the end time are determined based on the duration information; and sending control information to the radio frequency processing module based on the low power consumption state information of each carrier, where the control information is used to control one or more of the plurality of radio frequency channels to be in a low power consumption state, and the low power consumption state includes a disabled state or a dormant state.

It can be learned that, in the control method, the control information is sent based on the low power consumption state information of the carrier, so that the one or more of the plurality of radio frequency channels are set to a disabled state or a dormant state, thereby reducing power consumption of the device.

In an optional implementation, when there are a plurality of carriers, the sending control information to the radio frequency processing module based on the low power consumption state information of each carrier includes:

determining, based on the target radio frequency channel of each carrier and the start time and the end time for scheduling the target radio frequency channel, a duration range and a radio frequency channel corresponding to a mapped data sequence that is all-zero within scheduling duration for all the plurality of carriers; and sending the control information to the radio frequency processing module based on the duration range and the radio frequency channel corresponding to the mapped data sequence that is all-zero within the scheduling duration for all the plurality of carriers.

That the control information is used to control one or more of the plurality of radio frequency channels to be in a low power consumption state is specifically: controlling the radio frequency channel corresponding to the mapped data sequence that is all-zero within the scheduling duration for all the plurality of carriers to be in a low power consumption state within the duration range.

It can be learned that, in this implementation, the radio frequency processing module may set the radio frequency channel corresponding to the mapped data sequence that is all-zero within the scheduling duration for all the plurality of carriers to a low power consumption state within the duration range. Compared with the prior art, this can reduce power consumption of the terminal device.

In another optional implementation, the sending control information to the radio frequency processing module based on the low power consumption state information of each carrier includes:

sending the control information to the radio frequency processing module based on the target radio frequency channel of the carrier and the start time and the end time for scheduling the target radio frequency channel.

That the control information is used to control one or more of the plurality of radio frequency channels to be in a low power consumption state is specifically: controlling the target radio frequency channel to be in a low power consumption state within duration from the start time to the end time.

It can be learned that, in this implementation, the radio frequency processing module sets the target radio frequency channel corresponding to the mapped all-zero data sequence to a low power consumption state within the duration from the start time to the end time. Compared with a prior-art manner in which radio frequency processing further needs to be performed on an all-zero data sequence, this can greatly reduce power consumption of the terminal device.

In an optional implementation, the terminal device further includes a digital/analog conversion module, and the digital/analog conversion module includes a plurality of digital/analog conversion units.

The low power consumption state information includes a target digital/analog conversion unit and a start time and an end time for scheduling the target digital/analog conversion unit; the target digital/analog conversion unit is a digital/analog conversion unit corresponding to an all-zero data sequence in a plurality of data sequences that are mapped to the plurality of digital/analog conversion units after precoding processing is performed on to-be-sent data of the terminal device based on the precoding information; and the start time and the end time are determined based on the duration information.

The method further includes:

sending control information to the digital/analog conversion module based on the low power consumption state information of each carrier, where the control information is further used to control one or more of the plurality of digital/analog conversion units to be in a low power consumption state, and the low power consumption state includes a disabled state or a dormant state.

It can be learned that, in this embodiment, the control method may also enable the one or more digital/analog conversion units to be in a low power consumption state based on the low power consumption state information of the carrier, thereby reducing power consumption of the device.

In an optional implementation, when there are a plurality of carriers, the sending control information to the digital/analog conversion module based on the low power consumption state information of each carrier includes:

determining, based on the target digital/analog conversion unit of each carrier and the start time and the end time for scheduling the target digital/analog conversion unit, a duration range and a digital/analog conversion unit corresponding to a mapped data sequence that is all-zero within scheduling duration for all the plurality of carriers; and sending the control information to the digital/analog conversion module based on the duration range and the digital/analog conversion unit corresponding to the mapped data sequence that is all-zero within the scheduling duration for all the plurality of carriers.

That the control information is used to control one or more of the plurality of digital/analog conversion units to be in a low power consumption state is specifically: controlling the digital/analog conversion unit corresponding to the mapped data sequence that is all-zero within the scheduling duration for all the plurality of carriers to be in a low power consumption state within the duration range.

It can be learned that, in this implementation, the digital/analog conversion module may set the digital/analog conversion unit corresponding to the mapped data sequence that is all-zero within the scheduling duration for all the plurality of carriers to a low power consumption state within the duration range. Compared with a prior-art manner in which a digital/analog conversion operation is further performed when each data sequence mapped on all carriers is all-zero, this can reduce power consumption of the terminal device.

In another optional implementation, the sending control information to the digital/analog conversion module based on the low power consumption state information of each carrier includes:

sending the control information to the digital/analog conversion module based on the target digital/analog conversion unit of the carrier and the start time and the end time for scheduling the target digital/analog conversion unit.

That the control information is used to control one or more of the plurality of digital/analog conversion units to be in a low power consumption state is specifically: controlling the target digital/analog conversion unit to be in a low power consumption state within duration from the start time to the end time.

It can be learned that, in this implementation, the digital/analog conversion module may set the digital/analog conversion unit corresponding to the mapped all-zero data sequence to a low power consumption state within the duration from the start time to the end time that correspond to the duration information. Compared with a prior-art manner in which the digital/analog conversion module further needs to process an all-zero data sequence, this can reduce power consumption of the terminal device.

In an optional implementation, the terminal device further includes a resource mapping module, and the resource mapping module includes a plurality of resource mapping units.

The low power consumption state information includes a target resource mapping unit and a start time and an end time for scheduling the target resource mapping unit; the target resource mapping unit is a resource mapping unit corresponding to an all-zero data sequence in a plurality of data sequences that are mapped to the plurality of resource mapping units after precoding processing is performed on to-be-sent data of the terminal device based on the precoding information; and the start time and the end time are determined based on the duration information.

The method further includes:

sending control information to the resource mapping module based on the low power consumption state information of each carrier.

The control information is further used to control one or more of the plurality of resource mapping units to be in a low power consumption state, and the low power consumption state includes a disabled state or a dormant state.

It can be learned that, in this implementation, the resource mapping module may alternatively control, based on the low power consumption state information, the one or more of the plurality of resource mapping units to be in a low power consumption state, thereby reducing power consumption of the terminal device.

In an optional implementation, when there are a plurality of carriers, the sending control information to the resource mapping module based on the low power consumption state information of each carrier includes:

determining, based on the target resource mapping unit of each carrier and the start time and the end time for scheduling the target resource mapping unit, a duration range and a resource mapping unit corresponding to the mapped data sequence that is all-zero within the scheduling duration for all the plurality of carriers; and sending the control information to the resource mapping module based on the duration range and the resource mapping unit corresponding to the mapped data sequence that is all-zero within the scheduling duration for all the plurality of carriers.

That the control information is used to control one or more of the plurality of resource mapping units to be in a low power consumption state is specifically: controlling the resource mapping unit corresponding to the mapped data sequence that is all-zero within the scheduling duration for all the plurality of carriers to be in a low power consumption state within the duration range.

It can be learned that, in this implementation, the resource mapping module may set the resource mapping unit corresponding to the mapped data sequence that is all-zero within the scheduling duration for all the plurality of carriers to a low power consumption state within the duration range. Compared with a prior-art manner in which the resource mapping module further needs to process an all-zero data sequence, this can reduce power consumption of the terminal device.

In another optional implementation, the sending control information to the resource mapping module based on the low power consumption state information of each carrier includes:

sending the control information to the resource mapping module based on the target resource mapping unit of the carrier and the start time and the end time for scheduling the target resource mapping unit.

That the control information is used to control one or more of the plurality of resource mapping units to be in a low power consumption state is specifically: controlling the target resource mapping unit to be in a low power consumption state within duration from the start time to the end time.

It can be learned that, in this implementation, the resource mapping module may set the resource mapping unit corresponding to the mapped all-zero data sequence to a low power consumption state within the scheduling duration of the carrier. Compared with a prior-art operation that resource mapping further needs to be performed even if a mapped data sequence is all-zero, this can reduce power consumption of the terminal device.

In an optional implementation, the terminal device further includes a symbol generation module, and the symbol generation module includes a plurality of symbol generation units.

The low power consumption state information includes a target symbol generation unit and a start time and an end time for scheduling the target symbol generation unit; the target symbol generation unit is a symbol generation unit corresponding to an all-zero data sequence in a plurality of data sequences that are mapped to the plurality of symbol generation units after precoding processing is performed on to-be-sent data of the terminal device based on the precoding information; and the start time and the end time are determined based on the duration information.

The method further includes:
 sending control information to the symbol generation module based on the low power consumption state information of each carrier.

The control information is further used to control one or more of the plurality of symbol generation units to be in a low power consumption state, and the low power consumption state includes a disabled state or a dormant state.

It can be learned that, in this implementation, the control information may be further sent to the symbol generation module based on the low power consumption state information of each carrier, so that the one or more of the plurality of symbol generation units are in a low power consumption state, thereby reducing power consumption of the terminal device.

In another optional implementation, when there are a plurality of carriers, the sending control information to the symbol generation module based on the low power consumption state information of each carrier includes:
 determining, based on the target symbol generation unit of each carrier and the start time and the end time for scheduling the target symbol generation unit, a duration range and a symbol generation unit corresponding to the mapped data sequence that is all-zero within the scheduling duration for all the plurality of carriers; and
 sending the control information to the symbol generation module based on the duration range and the symbol generation unit corresponding to the mapped data sequence that is all-zero within the scheduling duration for all the plurality of carriers.

That the control information is used to control one or more of the plurality of symbol generation units to be in a low power consumption state is specifically: controlling the symbol generation unit corresponding to the mapped data sequence that is all-zero within the scheduling duration for all the plurality of carriers to be in a low power consumption state within the duration range.

It can be learned that, in this implementation, the duration range and the symbol generation unit corresponding to the mapped data sequence that is all-zero within the scheduling duration for all the plurality of carriers may be determined based on the low power consumption information of each carrier, so that the symbol generation unit is in a low power consumption state within the duration range. Compared with a prior-art manner in which the symbol generation unit further needs to process a signal corresponding to a mapped all-zero data sequence, this can reduce power consumption of the terminal device.

In another optional implementation, the sending control information to the symbol generation module based on the low power consumption state information of each carrier includes:
 sending the control information to the symbol generation module based on the target symbol generation unit of the carrier and the start time and the end time for scheduling the target symbol generation unit.

That the control information is used to control one or more of the plurality of symbol generation units to be in a low power consumption state is specifically: controlling the target symbol generation unit to be in a low power consumption state within duration from the start time to the end time.

It can be learned that, in this implementation, the symbol generation unit corresponding to the mapped all-zero data sequence is set to a low power consumption state within the duration from the carrier data sending start time to the carrier data sending end time. Compared with a prior-art manner in which a signal corresponding to a mapped all-zero data sequence further needs to be processed, this can reduce power consumption of the terminal device.

The control information includes at least one of a switching instruction, a low power consumption control command, and low power consumption control information.

According to a third aspect, this application further provides a control device. The control device has some or all functions of implementing the foregoing method example. For example, the device may have functions of implementing some or all of the embodiments of this application, or may have a function of independently implementing any embodiment of this application. The functions may be implemented by hardware, or may be implemented by hardware executing corresponding software. The hardware or the software includes one or more units or modules corresponding to the foregoing functions.

In a possible design, the control device may include a processing unit and a communications unit. The processing unit is configured to support the control device in performing a corresponding function in the foregoing method. The communications unit is configured to support communication between the control device and another device. The control device may further include a storage unit. The storage unit is configured to be coupled to the processing unit, and stores a program instruction and data that are necessary for the control device. In an example, the processing unit may be a processor, the communications unit may be a transceiver, and the storage unit may be a memory.

According to a fourth aspect, an embodiment of the present invention provides a computer storage medium, configured to store a computer software instruction used by the foregoing transmit end. The computer storage medium includes a program designed for performing any aspect of the foregoing method.

According to a fifth aspect, this application further provides a computer program product including an instruction. When the computer program product is run on a computer, the computer is enabled to perform the control method according to the second aspect.

According to a sixth aspect, this application provides a chip system. The chip system includes a processor. The processor is configured to implement functions or operations in the foregoing aspects, for example, determine or process data and/or information in the foregoing method. In a possible design, the chip system further includes a memory. The memory is configured to store a necessary program instruction and necessary data. The chip system may include a chip, or may include a chip and another discrete component.

BRIEF DESCRIPTION OF DRAWINGS

FIG. 6 is a schematic flowchart of a control method according to an embodiment of the present invention;

DESCRIPTION OF EMBODIMENTS

Terms used in implementations of this application are only used to explain specific embodiments of this application, and are not intended to limit this application.

First, a process of resolving a problem proposed in this application is described with reference to the accompanying drawings.

Figure 1:
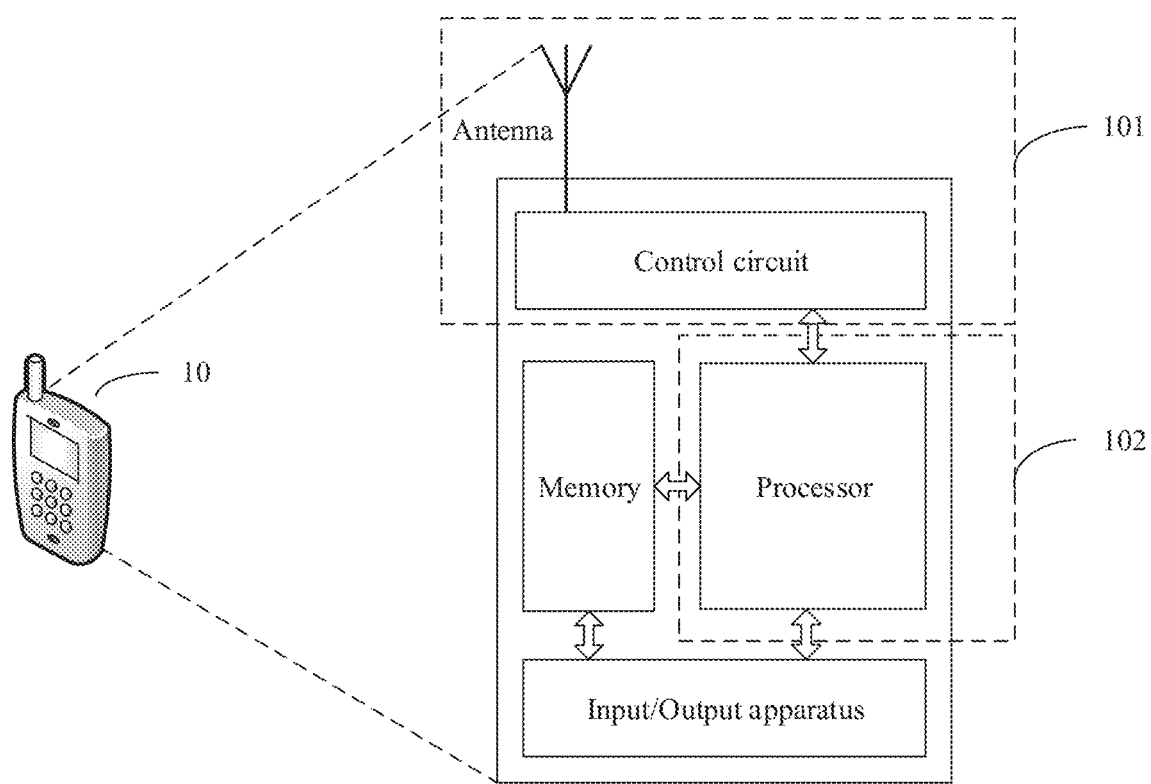
FIG. 1 is a schematic structural diagram of a terminal device according to an embodiment of this application.

FIG. 1 is a schematic structural diagram of a terminal device according to an embodiment of this application. FIG. 1 shows only main components of the terminal device. As shown in FIG. 1, the terminal device 10 includes a processor, a memory, a control circuit, an antenna, and an input/output apparatus. The processor is mainly configured to: process a communication protocol and communication data, control the entire terminal device, execute a software program, and process data of the software program. For example, the processor is configured to support the terminal device in performing the actions described in the foregoing precoding matrix transmission indication method embodiment. The memory is mainly configured to store a software program and data, for example, store the reference codebook or the differential codebook described in the foregoing embodiments. The control circuit is mainly configured to: perform conversion between a baseband signal and a radio frequency signal, and process the radio frequency signal. The control circuit and the antenna may also be collectively referred to as a transceiver that is mainly configured to send and receive a radio frequency signal in an electromagnetic wave form. The input/output apparatus such as a touchscreen, a display, or a keyboard is mainly configured to receive data entered by a user and output data to the user.

After the terminal device is powered on, the processor may read the software program in the storage unit, explain and execute an instruction of the software program, and process data of the software program. When data needs to be sent in a wireless manner, the processor performs baseband processing on the to-be-sent data, and then outputs a baseband signal to a radio frequency circuit. After performing radio frequency processing on the baseband signal, the radio frequency circuit sends a radio frequency signal to the outside through the antenna in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 1 shows only one memory and only one processor. Actually, the terminal device may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process a communication protocol and communication data, and the central processing unit is mainly configured to: control the entire terminal device, execute a software program, and process data of the software program. The processor in FIG. 1 integrates functions of the baseband processor and the central processing unit. A person skilled in the art may understand that the baseband processor and the central processing unit may alternatively be independent processors, and connected to each other by using a technology such as a bus. A person skilled in the art may understand that the terminal device may include a plurality of baseband processors to adapt to different network standards, the terminal device may include a plurality of central processing units to improve a processing capability of the terminal device, and all components of the terminal device may be connected to each other through various buses. The baseband processor may also be expressed as a baseband processing circuit, a baseband processing chip, or a baseband processing module. The central processing unit may also be expressed as a central processing circuit or a central processing chip. A function of processing the communication protocol and the communication data may be embedded into the processor, or may be stored in the storage unit in a form of a software program, and the processor executes the software program to implement a baseband processing function.

For example, in this embodiment of the present invention, the antenna having sending and receiving functions and the control circuit may be considered as a communications unit or a transceiver unit of the terminal device 10, and the processor having a processing function may be considered as a determining unit or a processing unit of the terminal device 10. As shown in FIG. 1, the terminal device 10 includes the transceiver unit 101 and the processing unit 102. The transceiver unit may also be referred to as a transceiver machine, a transceiver, a transceiver apparatus, or the like. Optionally, a component that is in the transceiver unit 101 and that is configured to implement a receiving function may be considered as a receiving unit, and a component that is in the transceiver unit 101 and that is configured to implement a sending function may be considered as a sending unit. In other words, the transceiver unit 101 includes the receiving unit and the sending unit. For example, the receiving unit may also be referred to as a receiver, a receiver machine, or a receiving circuit, and the sending unit may be referred to as a transmitter, a transmitter machine, or a transmitting circuit.

Figure 2:
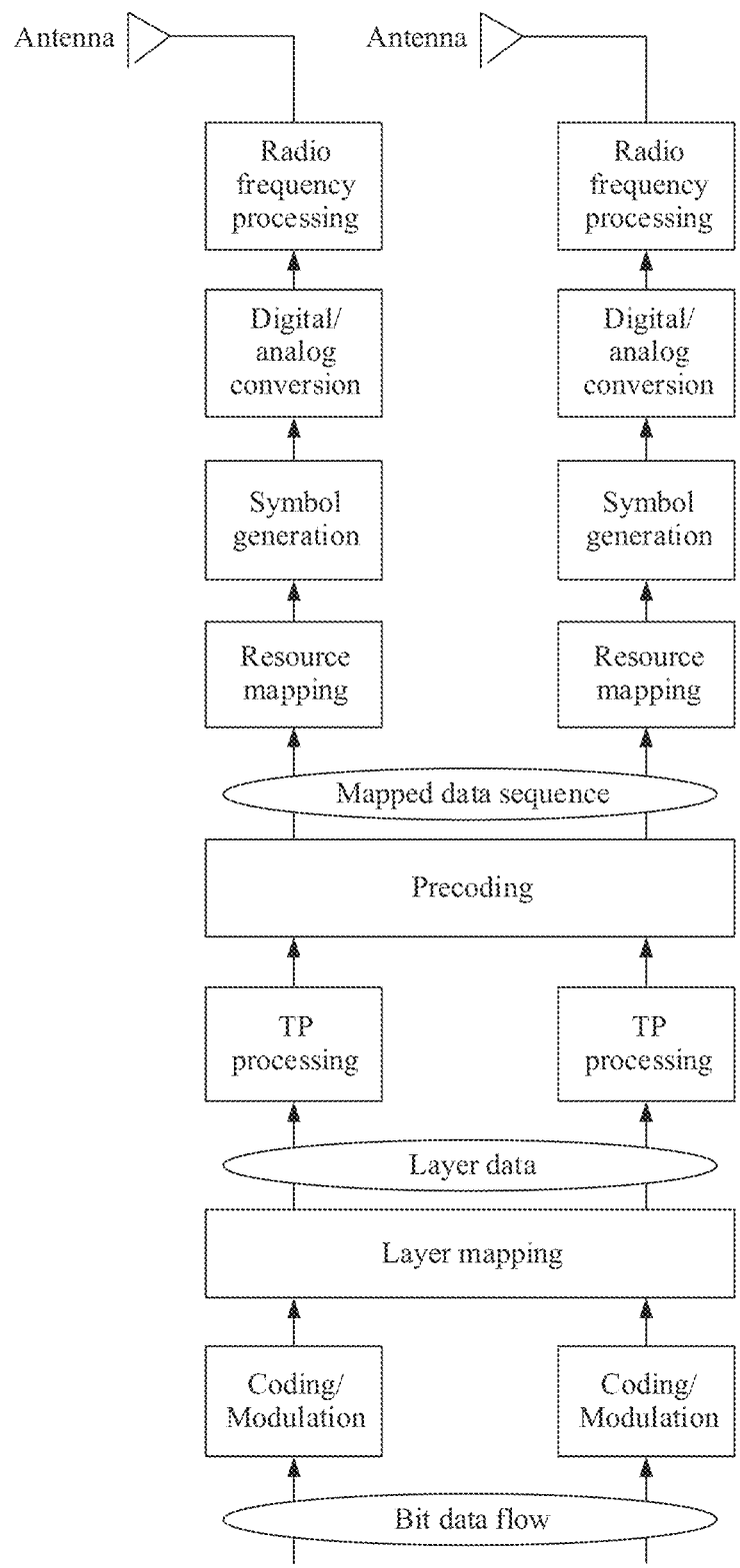
FIG. 2 is a schematic diagram of an uplink data processing process according to an embodiment of this application.

FIG. 2 is a schematic diagram of an uplink data processing procedure according to an embodiment of this application. As shown in FIG. 2, in the uplink data processing procedure, it is assumed that two codewords, two channels, and the like are scheduled for a terminal device. A bit data flow is a data flow that is input into a physical layer after scheduling processing is performed at a media access control (media access control, MAC) layer. A plurality of data flows may be scheduled each time, and each data flow is referred to as one codeword. Generally, two codewords may be simultaneously scheduled.

Coding/modulation is a process of performing scrambling, channel coding, cyclic redundancy check (Cyclic Redundancy Check, CRC) calculation, modulation, and the like on each codeword to obtain a complex sequence.

Layer mapping is mapping a complex sequence obtained by performing coding and modulation on each codeword to each layer to obtain a parallel data sequence. A quantity of layers is determined based on a scheduling parameter of a network device.

A transmission preprocessing (transmission preprocessing, TP) process is performing discrete Fourier transform (Discrete Fourier Transform, DFT) to form a single-carrier frequency division multiple access (Single-carrier Frequency-Division Multiple Access, SC-FDMA) symbol. The process is an optional processing process.

Precoding is multiplying layer data by one precoding matrix to obtain a plurality of pieces of antenna port data by mapping the layer data. Each codeword corresponds to one precoding matrix, and to-be-sent data obtained by performing the foregoing several processing procedures on each codeword is multiplied by the precoding matrix corresponding to the codeword to obtain a plurality of pieces of antenna port data by mapping layer data corresponding to the codeword. In this embodiment of the present invention, the plurality of pieces of antenna port data are referred to as a data sequence mapped after precoding.

For example, it is assumed that to-be-sent data obtained by performing the foregoing several processing procedures on one codeword is $[y^{(0)}(i) \ldots y^{(v-1)}(i)]^T$, where $i=0, 1, \ldots, M_{symb}^{layer}-1$, and v is a quantity of layers, that is, a quantity of input vectors. When v is 1, the input sequence includes one vector group; when v is 2, the input sequence includes two vector groups, and so on. The terminal device determines, based on scheduling information of the network device, that a precoding matrix corresponding to scheduling duration T is W. In this case, data sequences obtained after the input sequence is left-multiplied by the precoding matrix W are:

$$\begin{bmatrix} z^{(p_0)}(i) \\ \vdots \\ z^{(p_{\rho-1})}(i) \end{bmatrix} = W \begin{bmatrix} y^{(0)}(i) \\ \vdots \\ y^{(v-1)}(i) \end{bmatrix}$$

Herein, $i=0, 1, \ldots, M_{symb}^{ap}-1$, $M_{symb}^{ap}=M_{symb}^{layer}$, and $\{p_0, \ldots, p_{\rho-1}\}$ are channels corresponding to all the mapped data sequences.

A plurality of data sequences are obtained by performing precoding and mapping on all codewords, and subsequent processing procedures are separately performed. To be specific, resource mapping, symbol generation, upsampling, radio frequency processing, and the like are separately performed for different data sequences.

Resource mapping is mapping a data sequence mapped after precoding to a scheduling resource; symbol generation is performing inverse fast Fourier transform to change frequency-domain data into time-domain data and adding a cyclic prefix; and radio frequency processing is inputting a data signal into a radio frequency end to perform operations such as digital/analog conversion and radio frequency amplification processing. Optionally, after symbol generation is performed, radio frequency processing may be performed after digital/analog conversion.

In this embodiment of the present invention, with reference to the terminal device shown in FIG. 1, in the foregoing uplink data processing procedure shown in FIG. 2, precoding processing and operations performed before the precoding processing may be performed by a baseband processing module, and operations performed after the precoding processing may be performed by a resource mapping module, a symbol generation module, a radio frequency processing module, and the like in the control circuit. For example, resource mapping is performed by the resource mapping module, symbol generation is performed by the symbol generation module, digital/analog conversion is performed by a digital/analog conversion module, and radio frequency processing is performed by the radio frequency processing module.

A plurality of data sequences obtained after precoding processing are processed on different channels. Therefore, the foregoing modules each may include units corresponding to the plurality of channels, so as to correspondingly process the mapped data sequences. For example, the resource mapping module may include a plurality of resource mapping units, and the plurality of resource mapping units are resource mapping units used when the terminal device sends data, or the plurality of resource mapping units are resource mapping units that are determined when the terminal device reports a capability to the network device and that are used to send data. The symbol generation module includes a plurality of symbol generation units, to respectively process the data sequences mapped after precoding processing, and the plurality of symbol generation units are symbol generation units used when the terminal device sends data, or the plurality of symbol generation units are symbol generation units that are determined when the terminal device reports a capability to the network device and that are used to send data. The digital/analog conversion module also includes a plurality of digital/analog conversion units, and the plurality of digital/analog conversion units are digital/analog conversion units used when the terminal device sends data, or the plurality of digital/analog conversion units are digital/analog conversion units that are determined when the terminal device reports a capability to the network device and that are used to send data. The radio frequency processing module includes a plurality of radio frequency channels, and the plurality of radio frequency channels are radio frequency channels used when the terminal device sends data, or the plurality of radio frequency channels are radio frequency channels that are determined when the terminal device reports a capability to the network device and that are used to send data. In this embodiment of the present invention, precoding processing in the uplink data processing procedure and the related operations performed before the precoding processing are performed by the baseband processing module. It should be noted that the module division is merely an example, and there may be another module division method. This is not limited in this embodiment of the present invention.

Figure 3:
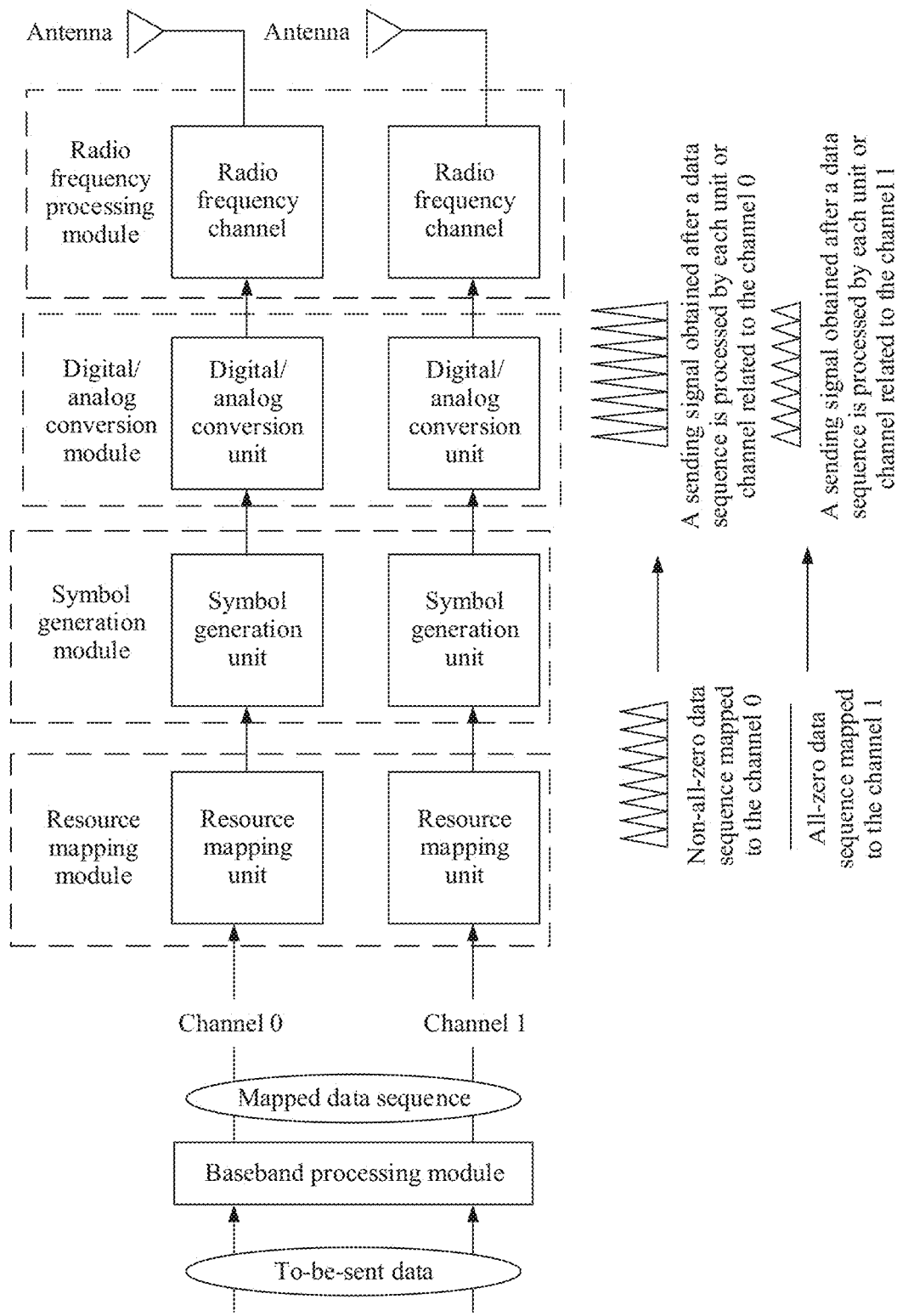
FIG. 3 is a schematic diagram of another uplink data processing process according to an embodiment of the present invention.

FIG. 3 is a schematic diagram of sending uplink data according to an embodiment of the present invention. In FIG. 3, two channels are used as an example. To be specific, two data sequences are obtained through mapping after precoding processing, and the two data sequences are sent respectively on the two channels for related processing. For example, after the mapped data sequences are separately processed by a resource mapping module, a symbol generation module, a digital/analog conversion module, and a radio frequency processing module, the mapped data sequences are sent through corresponding antennas. In this way, a receive end implements a better spatial characteristic, and channel performance is improved.

However, it is learned from practical detection that a plurality of data sequences mapped by the baseband processing module include an all-zero data sequence. From the perspective of algorithm performance, it is not expected that an all-zero data sequence has any corresponding sending signal. However, an all-zero data sequence is still processed in a current data processing method.

For example, in FIG. 3, a data sequence mapped by the baseband processing module to a channel 0 is non-all-zero, and after the data sequence is processed by the modules on the channel 0, a sending signal shown in FIG. 3 is obtained. A data sequence mapped by the baseband processing module to a channel 1 is all-zero, and after the data sequence is processed by the modules on the channel 1, a sending signal shown in FIG. 3 is obtained. It can be learned that, although the data sequence mapped by the baseband processing module to the channel 1 is all-zero, the sending signal obtained after the processing is non-all-zero. Although a receive end may filter out, in a signal processing process, interference caused by the sending signal corresponding to the all-zero data sequence, the terminal further needs to perform unnecessary subsequent processing on data in the all-zero data sequence. Consequently, unnecessary power consumption of the terminal is caused.

Therefore, an embodiment of this application provides a terminal device, to reduce power consumption of the terminal and avoid unnecessary power consumption of the terminal. In other words, this application provides a terminal device capable of setting some or all units on a specific channel corresponding to an all-zero data sequence mapped after precoding processing to a low power consumption state based on precoding information and duration information of each carrier. Compared with a prior-art manner in which related processing still needs to be performed even if a data sequence mapped to a channel is all-zero, this application can greatly reduce power consumption of the terminal device. The following describes in detail the terminal device provided in this application.

In this embodiment of this application, the precoding information may be determined in different transmission modes. For example, in a codebook-based transmission mode, a network device may indicate the precoding information such as a codebook index number and a quantity of layers to the terminal device through signaling. In a non-codebook-based transmission mode, the terminal device uses a channel measurement result of a reference signal as the precoding information by using uplink and downlink reciprocity. In an open-loop-based transmission mode, the precoding information includes configuration information of the network device, a codebook index number randomly selected by the terminal device based on the configuration information, and the like.

As described above, the precoding information may be dynamically indicated by the network device through signaling, or may be semi-statically indicated through a higher layer configuration. Similarly, in this embodiment of the present invention, the duration information is duration information used when the terminal device sends data. For example, the duration information may be duration information used when the network device schedules the terminal device to send data, or may be duration information configured by the network device for the terminal device to send data. The duration information may be scheduled or configured in a form of a symbol, a slot, a subframe, and/or a frame. In this embodiment of the present invention, the terminal device may send data through one or more carriers. One carrier corresponds to one piece of precoding information and one piece of duration information. The one or more carriers may be configured by the network device through higher layer signaling, and then the terminal device may be scheduled by using downlink control information, to send data on the one or more carriers.

In this embodiment of the present invention, a unit included in a channel or a radio frequency channel corresponding to an all-zero data sequence mapped after processing by the baseband processing module is referred to as a target unit or channel. For example, a resource mapping unit corresponding to a mapped all-zero data sequence in the resource mapping module is referred to as a target resource mapping unit, a symbol generation unit corresponding to a mapped all-zero data sequence in the symbol generation module is referred to as a target symbol generation unit, and a radio frequency channel corresponding to a mapped all-zero data sequence in the radio frequency processing module is referred to as a target radio frequency channel. In this embodiment of the present invention, "mapped data sequence" is a data sequence that is output to each channel after precoding processing, and is not content related to layer mapping. In other words, "mapped data sequence" in this embodiment of the present invention is a data sequence obtained after precoding processing is performed on to-be-sent data, for example, a data sequence obtained after the to-be-sent data is multiplied by a precoding matrix. The data sequence is output to a channel for corresponding processing.

In this embodiment of the present invention, a data sequence is all-zero in the following several implementations. One implementation is that a data sequence mapped to one or more channels after precoding processing is zero or close to zero. For example, a data sequence mapped to a channel after precoding processing is less than a preset threshold. Another implementation is that each piece of data in one or more rows in a precoding matrix determined based on the precoding information is zero or is less than a preset threshold. Therefore, in this embodiment of the present invention, a radio frequency channel, a resource mapping unit, a symbol generation unit, and/or a digital/analog conversion unit corresponding to an all-zero data sequence in a plurality of data sequences each are/is a unit included in one or more channels corresponding to a data sequence that is zero or is close to zero and that is mapped after precoding processing, or a unit included in a channel corresponding to a row in which each piece of row data is zero or is less than a preset threshold in a precoding matrix.

In this embodiment of the present invention, a low power consumption state is a disabled state, a dormant state, or a standby state. A state opposite to the low power consumption state may be referred to as a non-low power consumption state. To be specific, the non-low power consumption state is a working state other than the disabled state, the dormant state, the or the standby state. In other words, the low power consumption state and the non-low power consumption state herein are not distinguished based on power consumption, but are determined based on a working state of a unit or a channel.

In this embodiment of the present invention, the baseband processing module may determine, for each of one or more carriers of the terminal device, low power consumption state information of the carrier based on precoding information and duration information of the carrier.

The low power consumption state information includes a target radio frequency channel and a start time and an end time for scheduling the target radio frequency channel; the target radio frequency channel is a radio frequency channel corresponding to an all-zero data sequence in a plurality of data sequences that are mapped to the plurality of radio frequency channels after precoding processing is performed on to-be-sent data of the terminal device based on the precoding information; and the start time and the end time are determined based on the duration information; and/or the low power consumption state information includes a target digital/analog conversion unit and a start time and an end time for scheduling the target digital/analog conversion unit; the target digital/analog conversion unit is a digital/analog conversion unit corresponding to an all-zero data sequence in a plurality of data sequences that are mapped to the plurality of digital/analog conversion units after precoding processing is performed on to-be-sent data of the terminal device based on the precoding information; and the start time and the end time are determined based on the duration information; and/or the low power consumption state information includes a target resource mapping unit and a start time and an end time for scheduling the target resource mapping unit; the target resource mapping unit is a resource mapping unit corresponding to an all-zero data sequence in a plurality of data sequences that are mapped to the plurality of resource mapping units after precoding processing is performed on to-be-sent data of the terminal device based on the precoding information; and the start time and the end time are determined based on the duration information; and/or the low power consumption state information includes a target symbol generation unit and a start time and an end time for scheduling the target symbol generation unit; the target symbol generation unit is a symbol generation unit corresponding to an all-zero data sequence in a plurality of data sequences that are mapped to the plurality of symbol generation units after precoding processing is performed on to-be-sent data of the terminal device based on the precoding information; and the start time and the end time are determined based on the duration information.

In an optional implementation, that the baseband processing module determines, for each of one or more carriers of the terminal device, low power consumption state information of the carrier based on precoding information and duration information of the carrier may be specifically:

for each of the one or more carriers of the terminal device, the baseband processing module determines a precoding matrix of the carrier based on the precoding information of the carrier, and determines the target radio frequency channel, the target resource mapping unit, the target digital/analog conversion unit, and/or the target symbol generation unit based on an all-zero row in the precoding matrix of the carrier.

In other words, the target radio frequency channel, the target resource mapping unit, the target digital/analog conversion unit, and/or the target symbol generation unit each are/is a unit or a radio frequency channel in a channel corresponding to the all-zero row in the precoding matrix.

For example, the precoding matrix determined by the baseband processing module based on the precoding information is:

$$\frac{1}{2}\begin{bmatrix} 0 & 0 \\ 0 & 0 \\ 1 & 0 \\ 0 & 1 \end{bmatrix}$$

It can be learned that, when each row vector in the first two rows in the precoding matrix is zero, after the baseband processing module multiplies the row vector by an input sequence, an output sequence is zero. In this case, a data sequence obtained by mapping vectors in each of the first two rows in the precoding matrix is all-zero. Therefore, units or radio frequency channels in channels corresponding to the first two rows are target radio frequency channels, target resource mapping units, target digital/analog conversion units, and/or target symbol generation units shown in FIG. 3.

In another optional implementation, that the baseband processing module determines, for each of one or more carriers of the terminal device, low power consumption state information of the carrier based on precoding information and duration information of the carrier may be specifically:

the baseband processing module determines the target radio frequency channel, the target resource mapping unit, the target digital/analog conversion unit, and/or the target symbol generation unit based on a low power consumption state indication table corresponding to the precoding information.

The low power consumption state indication table stores a correspondence between each piece of precoding information and a power consumption state value. The power consumption state value includes "true" and "false". If the power consumption state value is "true", it indicates that a unit and/or a radio frequency channel in a corresponding channel may be in a disabled state or a dormant state; or if the power consumption state value is "false", it indicates that a unit and/or a radio frequency channel in a corresponding channel may be in a non-low power consumption state such as a working state.

For example, it is assumed that the precoding information includes: a quantity of layers is 2, and a codebook index number is 5. The low power consumption state indication table corresponding to the precoding information in a plurality of low power consumption state indication tables stored in the memory is:

$$\begin{bmatrix} \text{TRUE} \\ \text{TRUE} \\ \text{FALSE} \\ \text{FALSE} \end{bmatrix}$$

Therefore, the target radio frequency channel, the target resource mapping unit, the target digital/analog conversion unit, and/or the target symbol generation unit determined by the baseband processing module based on the precoding information each are/is a unit or a radio frequency channel in a channel corresponding to the first two rows "true" in the low power consumption state indication table.

In this embodiment of the present invention, the duration information includes a scheduling slot offset, a scheduling slot number, a start symbol, and scheduling duration. For example, if the scheduling slot offset is K2, the scheduling slot number is a slot n, the start symbol is S, and the scheduling duration is L, a start time corresponding to the duration information is an $S^{th}$ symbol in a slot (slot n+K2), and an end time is an $(S+L)^{th}$ symbol in the slot (slot n+K2).

The following separately describes optional embodiments in which at least one of the target radio frequency channel, the target resource mapping unit, the target digital/analog conversion unit, and the target symbol generation unit may be set to a low power consumption state.

In an embodiment, the baseband processing module determines, for each of one or more carriers of the terminal device, low power consumption state information of the carrier based on precoding information and duration information of the carrier. The low power consumption state information includes a target radio frequency channel and a start time and an end time for scheduling the target radio frequency channel; the target radio frequency channel is a radio frequency channel corresponding to an all-zero data sequence in a plurality of data sequences that are mapped to the plurality of radio frequency channels after precoding processing is performed on to-be-sent data of the terminal device based on the precoding information; and the start time and the end time are determined based on the duration information. Then, the baseband processing module sends control information to the radio frequency processing module based on the low power consumption state information of each carrier. The radio frequency processing module is configured to control, based on the control information, one or more of the plurality of radio frequency channels to be in a low power consumption state. The low power consumption state includes a disabled state or a dormant state.

In an optional implementation, that the baseband processing module sends control information to the radio frequency processing module based on the low power consumption state information of each carrier is specifically: sending the control information to the radio frequency processing module based on the target radio frequency channel of the carrier and the start time and the end time for scheduling the target radio frequency channel. That the radio frequency processing module controls, based on the control information, one or more of the plurality of radio frequency channels to be in a low power consumption state is specifically: The radio frequency processing module controls the target radio frequency channel to be in a low power consumption state within duration from the start time to the end time.

In an example, the control information may include a low power consumption control command and a non-low power consumption control command. Specifically, after the baseband processing module determines the corresponding start time and end time based on the duration information, the baseband processing module sends a disable command or a dormancy command to the determined target radio frequency channel at the start time, so that the target radio frequency channel is in a low power consumption state; and sends an enable command to the target radio frequency channel at the end time, so that the target radio frequency channel is in a non-low power consumption state.

In another example, the control information may be low power consumption control information. Specifically, after the baseband processing module determines the start time and the end time based on the duration information, the baseband processing module may generate the low power consumption control information. The low power consumption control information includes the start time and the end time corresponding to the scheduling duration, and a control command corresponding to the scheduling duration. The control command may be a low power consumption control command. The baseband processing module may send the low power consumption control information to the target radio frequency channel, so that the target radio frequency channel is in a low power consumption state within the scheduling duration.

In still another example, the control information may be a switching instruction. Specifically, after the baseband processing module determines, based on current precoding information 1 and duration information 1, that the target radio frequency channel is a radio frequency channel 1 and determines a start time t1 and an end time t2 of scheduling duration, the baseband processing module determines whether the radio frequency channel 1 is in a low power consumption state within scheduling duration corresponding to previous duration information 0. If the radio frequency channel 1 is in a low power consumption state within the scheduling duration corresponding to the previous duration information 0, the baseband processing module does not need to send a switching command to the target radio frequency channel. The baseband processing module determines, based on next precoding information 2 and corresponding duration information 2, that the target radio frequency channel is a radio frequency channel 2 and determines a start time t3 and an end time t4 of scheduling duration. In this case, the baseband processing module needs to send switching instructions to both the radio frequency channel 1 and the radio frequency channel 2 at the start time t3, so that the radio frequency channel 1 switches from a low power consumption state to a non-low power consumption state, for example, from a disabled state or a dormant state to a working state, and the radio frequency channel 2 switches from a non-low power consumption state to a low power consumption state, for example, from a working state to a disabled state or a dormant state. Subsequent operations can be deduced by analogy. It can be learned that, in this example, the baseband processing module determines, based on a state of each radio frequency channel in previous scheduling duration, whether to send a switching instruction, so that the target radio frequency channel is in a low power consumption state within corresponding scheduling duration.

In another optional implementation, when there are a plurality of carriers, that the baseband processing module sends control information to the radio frequency processing module based on the low power consumption state information of each carrier is specifically: determining, based on the target radio frequency channel of each carrier and the start time and the end time for scheduling the target radio frequency channel, a duration range and a radio frequency channel corresponding to a mapped data sequence that is all-zero within scheduling duration for all the plurality of carriers; and sending the control information to the radio frequency processing module based on the duration range and the radio frequency channel corresponding to the mapped data sequence that is all-zero within the scheduling duration for all the plurality of carriers. That the radio frequency processing module controls, based on the control information, one or more of the plurality of radio frequency channels to be in a low power consumption state is specifically: The radio frequency processing module controls the radio frequency channel corresponding to the mapped data sequence that is all-zero within the scheduling duration for all the plurality of carriers to be in a low power consumption state within the duration range.

In this embodiment of the present invention, the target radio frequency channel corresponding to each carrier and the start time and the end time for scheduling the target radio frequency channel are referred to as the low power consumption state information of the carrier. The baseband processing module needs to determine, based on low power consumption state information of all the scheduled carriers, the duration range and the radio frequency channel corresponding to the mapped data sequence that is all-zero within the scheduling duration for all the plurality of carriers. In this embodiment of the present invention, the duration range and the radio frequency channel corresponding to the mapped data sequence that is all-zero within the scheduling duration for all the plurality of carriers are referred to as low power consumption state combination information.

Figure 4:
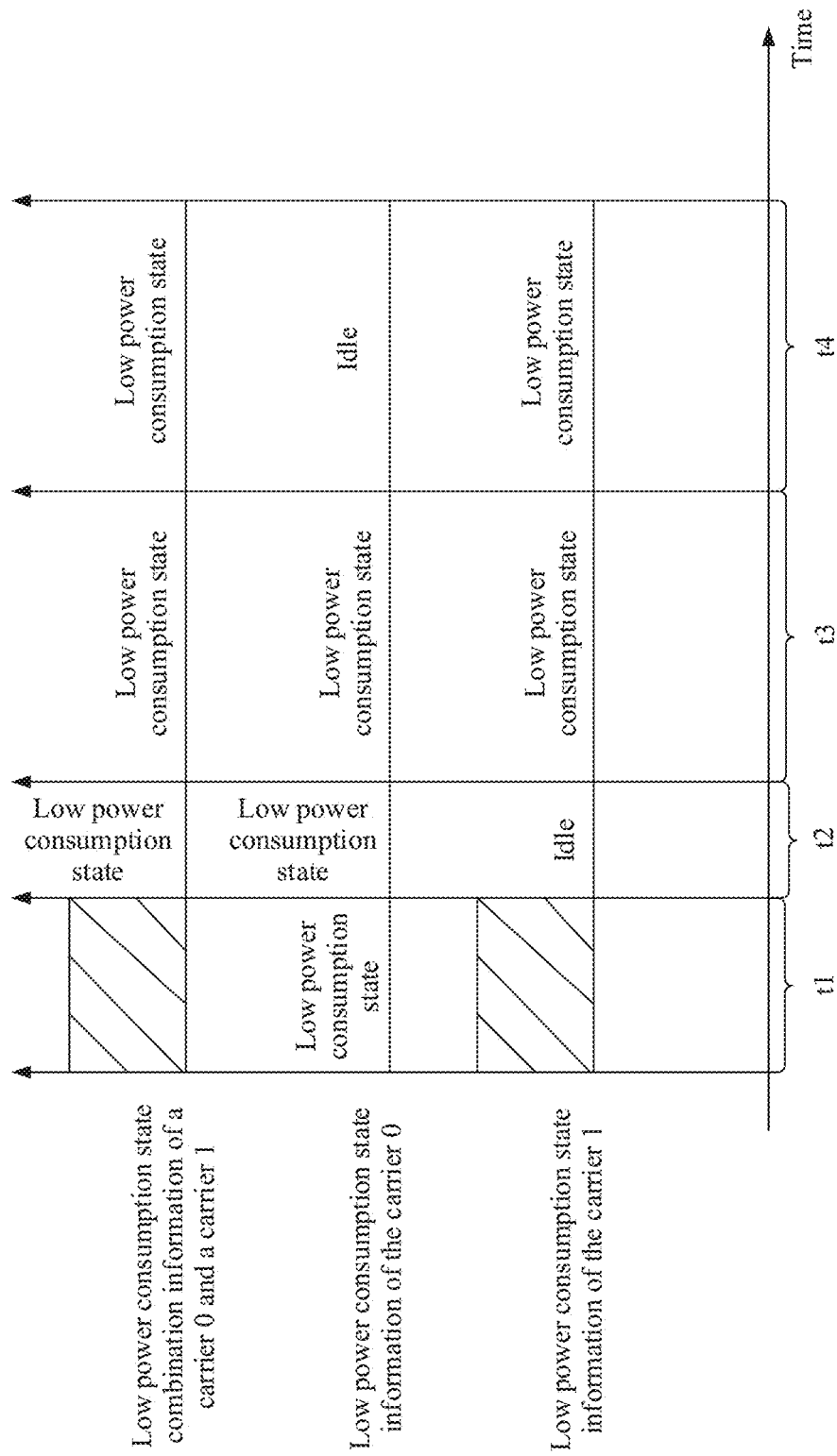
FIG. 4 is a schematic diagram of low power consumption state combination information according to an embodiment of the present invention.

In an example, FIG. 4 is a schematic diagram of low power consumption state combination information according to an embodiment of the present invention. As shown in FIG. 4, it is assumed that low power consumption state information of a carrier 0 within scheduling duration t1 to t4 is that a radio frequency channel 0 can be in a low power consumption state on the carrier 0 within scheduling duration t1 to t3, and the radio frequency channel 0 is idle because no data is scheduled on the radio frequency channel 0 within scheduling duration t4; and low power consumption state information of a carrier 1 within the scheduling duration t1 to t4 is that the radio frequency channel 0 can be in a low power consumption state on the carrier 1 within scheduling duration t3 to t4, the radio frequency channel 0 can be in a non-low power consumption state within scheduling duration t1, and no data is scheduled on the radio frequency channel 0 within scheduling duration t2. The baseband processing module obtains the low power consumption state combination information based on the low power consumption state information of the carrier 0 and the low power consumption state information of the carrier 1. As shown in FIG. 4, when the radio frequency channel 0 can be in a low power consumption state on both the carrier 0 and the carrier 1, or when the radio frequency channel 0 is in a low power consumption state on one carrier and is idle on the other carrier, the radio frequency channel 0 can finally be in a low power consumption state within the scheduling duration. As shown in the low power consumption state combination information in FIG. 4, the radio frequency channel 0 may be in a low power consumption state within scheduling duration t2 to t4, and may be in a non-low power consumption state within the scheduling duration t1.

Therefore, the baseband processing module may send a low power consumption control command to a corresponding radio frequency channel based on the low power consumption state combination information, so that the corresponding radio frequency channel is in a low power consumption state. Alternatively, the baseband processing module may generate low power consumption control information based on the low power consumption state combination information, where the low power consumption control information includes a start time and an end time at which the radio frequency channel can be in a low power consumption state; and send the low power consumption control information to a corresponding radio frequency channel, so that the corresponding radio frequency channel is in a low power consumption state. Alternatively, the baseband processing module may send, based on the low power consumption state combination information, a switching instruction to a radio frequency channel that needs to switch to a low power consumption state or a non-low power consumption state, so that the corresponding radio frequency channel is in a low power consumption state within duration from a start time to an end time in the low power consumption state combination information.

In another example, scheduling duration of different carriers is in a non-aligned state. In other words, not as shown in FIG. 4, scheduling duration corresponding to each carrier is t1 to t4. For a non-aligned state of scheduling duration corresponding to the carriers, the baseband processing module obtains low power consumption state combination information in the same manner, but the start time and the end time in the low power consumption state combination information no longer correspond to complete scheduling duration.

Figure 5:
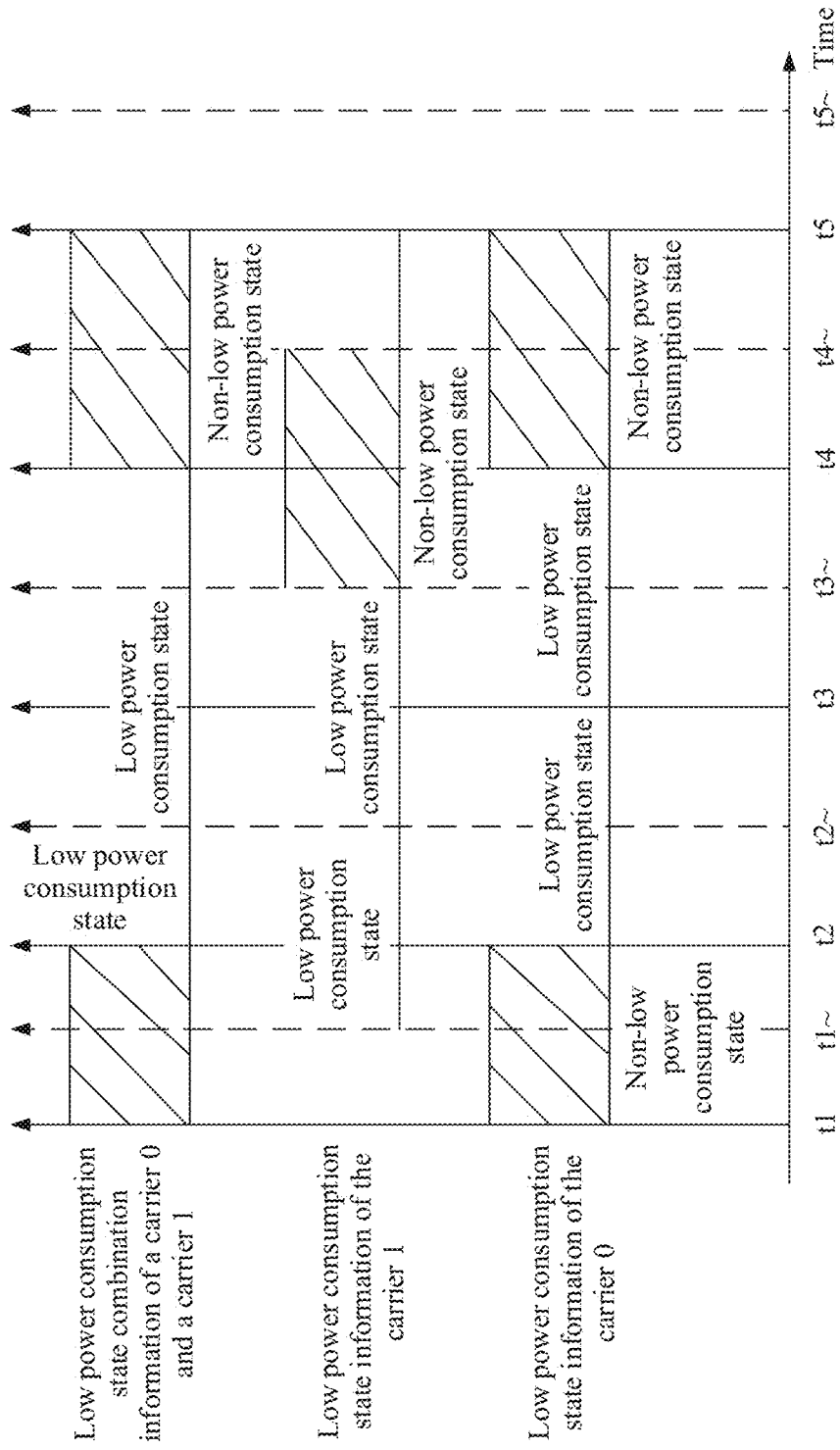
FIG. 5 is a schematic diagram of another piece of low power consumption state combination information according to an embodiment of the present invention.

FIG. 5 is a schematic diagram of another piece of low power consumption state combination information according to an embodiment of the present invention. As shown in FIG. 5, in the low power consumption state combination information, a state switching point is a start time of scheduling duration corresponding to a carrier that can finally trigger state switching of a radio frequency channel. For example, scheduling duration corresponding to a carrier 0 on a radio frequency channel 0 is t1~ to t5~, scheduling duration corresponding to a carrier 1 on the radio frequency channel 0 is t1 to t5, and time points that can trigger state switching based on the low power consumption state combination information are t2, t3~, and t5. Therefore, the baseband processing module needs to sequentially send switching instructions to the radio frequency channel 0 at t2, t3~, and t5, to switch a power consumption state of the radio frequency channel 0.

In conclusion, in this embodiment, the baseband processing module may control, based on low power consumption state information of a single carrier or low power consumption state combination information of a plurality of carriers, one or more radio frequency channels to be in a low power consumption state. This avoids power consumption caused by performing radio frequency processing when a mapped data sequence in the radio frequency processing module is all-zero. In other words, power consumption of the terminal device can be reduced according to this embodiment of the present invention.

In another embodiment, the low power consumption state information includes a target resource mapping unit and a start time and an end time for scheduling the target resource mapping unit; the target resource mapping unit is a resource mapping unit corresponding to an all-zero data sequence in a plurality of data sequences that are mapped to the plurality of resource mapping units after precoding processing is performed on to-be-sent data of the terminal device based on the precoding information; and the start time and the end time are determined based on the duration information. The baseband processing module is further configured to send control information to the resource mapping module based on the low power consumption state information of each carrier. The resource mapping module is configured to control, based on the control information, one or more of the plurality of resource mapping units to be in a low power consumption state, where the low power consumption state includes a disabled state or a dormant state. It can be learned that, in this embodiment, the resource mapping module may alternatively control, based on the low power consumption state information, the one or more of the plurality of resource mapping units to be in a low power consumption state, thereby reducing power consumption of the terminal device.

In an optional implementation, that the baseband processing module sends control information to the resource mapping module based on the low power consumption state information of each carrier is specifically: sending the control information to the resource mapping module based on the target resource mapping unit of the carrier and the start time and the end time for scheduling the target resource mapping unit. That the resource mapping module controls, based on the control information, one or more of the plurality of resource mapping units to be in a low power consumption state is specifically: The resource mapping module controls the target resource mapping unit to be in a low power consumption state within duration from the start time to the end time.

It can be learned that, in this implementation, the resource mapping module may set the resource mapping unit corresponding to the mapped all-zero data sequence to a low power consumption state within the scheduling duration of the carrier. Compared with a prior-art operation that resource mapping further needs to be performed even if a mapped data sequence is all-zero, this can reduce power consumption of the terminal device.

In another optional implementation, when there are a plurality of carriers, that the baseband processing module sends control information to the resource mapping module based on the low power consumption state information of each carrier is specifically: determining, based on the target resource mapping unit of each carrier and the start time and the end time for scheduling the target resource mapping unit, a duration range and a resource mapping unit corresponding to the mapped data sequence that is all-zero within the scheduling duration for all the plurality of carriers; and sending the control information to the resource mapping module based on the duration range and the resource mapping unit corresponding to the mapped data sequence that is all-zero within the scheduling duration for all the plurality of carriers. That the resource mapping module controls, based on the control information, one or more of the plurality of resource mapping units to be in a low power consumption state is specifically: The resource mapping module controls the resource mapping unit corresponding to the mapped data sequence that is all-zero within the scheduling duration for all the plurality of carriers to be in a low power consumption state within the duration range.

It can be learned that, in this implementation, the baseband processing module sends the control information to the resource mapping module, so that the resource mapping module can set the resource mapping unit corresponding to the mapped data sequence that is all-zero within the scheduling duration for all the plurality of carriers to a low power consumption state within the duration range. Compared with a prior-art manner in which the resource mapping module further needs to process an all-zero data sequence, this can reduce power consumption of the terminal device.

In still another example, the low power consumption state information includes a target digital/analog conversion unit and a start time and an end time for scheduling the target digital/analog conversion unit; the target digital/analog conversion unit is a digital/analog conversion unit corresponding to an all-zero data sequence in a plurality of data sequences that are mapped to the plurality of digital/analog conversion units after precoding processing is performed on to-be-sent data of the terminal device based on the precoding information; and the start time and the end time are determined based on the duration information. The baseband processing module is further configured to send control information to the digital/analog conversion module based on the low power consumption state information of each carrier. The digital/analog conversion module is configured to control, based on the control information, one or more of the plurality of digital/analog conversion units to be in a low power consumption state, where the low power consumption state includes a disabled state or a dormant state. It can be learned that, in this embodiment, the digital/analog conversion module may alternatively control, based on the low power consumption state information of the carrier, the one or more digital/analog conversion units to be in a low power consumption state, thereby reducing power consumption of the terminal device.

In an optional implementation, when there are a plurality of carriers, that the baseband processing module sends control information to the digital/analog conversion module based on the low power consumption state information of each carrier is specifically:

determining, based on the target digital/analog conversion unit of each carrier and the start time and the end time for scheduling the target digital/analog conversion unit, a duration range and a digital/analog conversion unit corresponding to a mapped data sequence that is all-zero within scheduling duration for all the plurality of carriers; and sending the control information to the digital/analog conversion module based on the duration range and the digital/analog conversion unit corresponding to the mapped data sequence that is all-zero within the scheduling duration for all the plurality of carriers.

That the digital/analog conversion module controls, based on the control information, one or more of the plurality of digital/analog conversion units to be in a low power consumption state is specifically:

The digital/analog conversion module controls the digital/analog conversion unit corresponding to the mapped data sequence that is all-zero within the scheduling duration for all the plurality of carriers to be in a low power consumption state within the duration range.

It can be learned that, in this implementation, the digital/analog conversion module may set the digital/analog conversion unit corresponding to the mapped data sequence that is all-zero within the scheduling duration for all the plurality of carriers to a low power consumption state within the duration range. Compared with a prior-art manner in which a digital/analog conversion operation is further performed when each data sequence mapped on all carriers is all-zero, this can reduce power consumption of the terminal device.

In another optional implementation, that the baseband processing module sends control information to the digital/analog conversion module based on the low power consumption state information of each carrier is specifically:

sending the control information to the digital/analog conversion module based on the target digital/analog conversion unit of the carrier and the start time and the end time for scheduling the target digital/analog conversion unit.

That the digital/analog conversion module controls, based on the control information, one or more of the plurality of digital/analog conversion units to be in a low power consumption state is specifically:

The digital/analog conversion module controls the target digital/analog conversion unit to be in a low power consumption state within duration from the start time to the end time.

It can be learned that, in this implementation, the digital/analog conversion module may set the digital/analog conversion unit corresponding to the mapped all-zero data sequence to a low power consumption state within the duration from the start time to the end time that correspond to the duration information. Compared with a prior-art manner in which the digital/analog conversion module further needs to process an all-zero data sequence, this can reduce power consumption of the terminal device.

In still another embodiment, the low power consumption state information includes a target symbol generation unit and a start time and an end time for scheduling the target symbol generation unit; the target symbol generation unit is a symbol generation unit corresponding to an all-zero data sequence in a plurality of data sequences that are mapped to the plurality of symbol generation units after precoding processing is performed on to-be-sent data of the terminal device based on the precoding information; and the start time and the end time are determined based on the duration information. The baseband processing module is further configured to send control information to the symbol generation module based on the low power consumption state information of each carrier. The symbol generation module is configured to control, based on the control information, one or more of the plurality of symbol generation units to be in a low power consumption state, where the low power consumption state includes a disabled state or a dormant state. It can be learned that, in this embodiment, the baseband processing module may determine the low power consumption state information of each carrier, and send the control information to the symbol generation module based on the low power consumption state information of each carrier, so as to control the one or more of the plurality of symbol generation units to be in a low power consumption state, thereby reducing power consumption of the terminal device.

In an optional implementation, when there are a plurality of carriers, that the baseband processing module sends control information to the symbol generation module based on the low power consumption state information of each carrier is specifically:

determining, based on the target symbol generation unit of each carrier and the start time and the end time for scheduling the target symbol generation unit, a duration range and a symbol generation unit corresponding to the mapped data sequence that is all-zero within the scheduling duration for all the plurality of carriers; and sending the control information to the symbol generation module based on the duration range and the symbol generation unit corresponding to the mapped data sequence that is all-zero within the scheduling duration for all the plurality of carriers.

That the symbol generation module controls, based on the control information, one or more of the plurality of symbol generation units to be in a low power consumption state is specifically:

The symbol generation module controls the symbol generation unit corresponding to the mapped data sequence that is all-zero within the scheduling duration for all the plurality of carriers to be in a low power consumption state within the duration range.

It can be learned that, in this implementation, the baseband processing module may determine, based on the low power consumption information of each carrier, the duration range and the symbol generation unit corresponding to the mapped data sequence that is all-zero within the scheduling duration for all the plurality of carriers, so that the symbol generation module can control the symbol generation unit to be in a low power consumption state within the duration range. Compared with a prior-art manner in which the symbol generation unit further needs to process a signal corresponding to a mapped all-zero data sequence, this can reduce power consumption of the terminal device.

In another optional implementation, that the baseband processing module sends control information to the symbol generation module based on the low power consumption state information of each carrier is specifically:

sending the control information to the symbol generation module based on the target symbol generation unit of the carrier and the start time and the end time for scheduling the target symbol generation unit.

That the symbol generation module controls, based on the control information, one or more of the plurality of symbol generation units to be in a low power consumption state is specifically:

The symbol generation module controls the target symbol generation unit to be in a low power consumption state within duration from the start time to the end time.

It can be learned that, in this implementation, the symbol generation module may set the symbol generation unit corresponding to the mapped all-zero data sequence to a low power consumption state within the duration from the carrier scheduling start time to the carrier scheduling end time. Compared with a prior-art manner in which a signal corresponding to a mapped all-zero data sequence further needs to be processed, this can reduce power consumption of the terminal device.

In addition to the radio frequency channel, the digital/analog conversion unit, the resource mapping unit, and the symbol generation unit described above, another unit can be further set to a low power consumption state, for example, an upsampling unit. It should be noted that a unit that can be set to a low power consumption state is a unit corresponding to a channel corresponding to an all-zero data sequence mapped after the baseband processing module performs precoding processing. In other words, after the baseband processing module performs precoding processing on to-be-sent data, if data sequences mapped to all channels include an all-zero data sequence, some or all modules or units involved in a subsequent processing procedure included in a channel corresponding to the all-zero data sequence may be set to a low power consumption state. An example in which some or all of a resource mapping unit, a symbol generation unit, a digital/analog conversion unit, and a radio frequency channel included in a channel may be set to a low power consumption state based on whether a data sequence obtained after precoding processing is all-zero is used in this embodiment of the present invention. This is not limited in this embodiment of the present invention.

For the plurality of carriers, precoding matrices corresponding to the carriers are different, and data sequences mapped to all channels may also be different. Therefore, only a channel corresponding to an all-zero data sequence mapped within scheduling duration of all the carriers can be set to a low power consumption state.

In this embodiment of this application, when the baseband processing module sends the control information to one or more of the resource mapping module, the symbol generation module, the digital/analog conversion module, and the radio frequency processing module, the control information is used to control a unit or a radio frequency channel corresponding to an all-zero data sequence mapped within scheduling duration of one or more carriers to be in a low power consumption state. Therefore, the control information may be implemented in a plurality of implementations. For example, the control information may include a low power consumption command and a non-low power consumption command. In this case, at a start time of a duration range in which a mapped data sequence is all-zero, the baseband processing module sends the low power consumption command to some or all of the foregoing modules; and at an end time of the duration range in which the mapped data sequence is all-zero, the baseband processing module sends the non-low power consumption command to some or all of the foregoing modules, so that one or more units in the some or all of the foregoing modules are in a low power consumption state. For another example, the control information may be a switching instruction. In this case, at an end time of a duration range in which a mapped data sequence is all-zero, the baseband processing module sends a switching instruction, so that one or more units in some or all of the foregoing modules are in a non-low power consumption state; and at a start time of the duration range in which the mapped data sequence is all-zero, the baseband processing module sends a switching instruction, so that one or more units in the some or all of the foregoing modules are in a low power consumption state. For another example, the control information may be low power consumption control information. In this case, the baseband processing module may send the low power consumption control information to some or all of the foregoing modules based on the low power consumption state information. The low power consumption control information includes a start time and an end time at which a mapped data sequence is all-zero, and a control command corresponding to the start time and the end time. The control command may be a low power consumption control command, so that the some or all of the foregoing modules are in a low power consumption state within duration from the start time to the end time. Optionally, the control information may be implemented in another optional implementation. This is not limited in this embodiment of the present invention.

Figure 7:
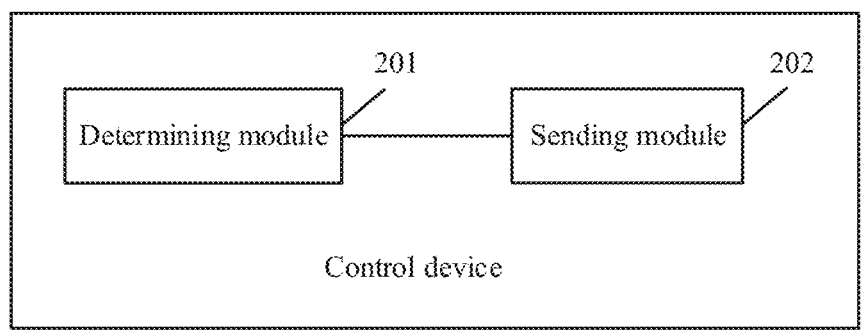
FIG. 7 is a schematic structural diagram of a control device according to an embodiment of the present invention.
Figure 8:
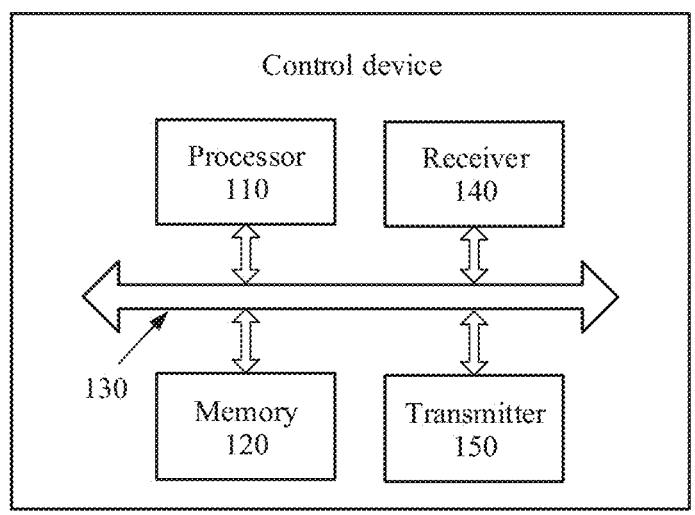
FIG. 8 is a schematic structural diagram of another control device according to an embodiment of the present invention.

For concepts, explanations, detailed descriptions, and other steps in FIG. 6 to FIG. 8 that are related to the technical solutions provided in the embodiments of this application, refer to the descriptions of the content in the foregoing methods or other embodiments. Details are not described herein again.

FIG. 6 is a schematic flowchart of a control method according to an embodiment of the present invention. The control method may be applied to a terminal device. The terminal device may include a radio frequency processing module, and the radio frequency processing module may include a plurality of radio frequency channels. The control method may alternatively be applied to a processor or a baseband processing chip. In this case, the processor or the baseband processing chip may include the radio frequency processing module, or may not include the radio frequency processing module. When the processor or the baseband processing chip does not include the radio frequency processing module, the radio frequency processing module may be disposed in a device that includes the processor or the baseband processing chip. This is not limited in this embodiment of the present invention. In FIG. 6, an example in which a control device performs the control method is used for description. The control device is located in the terminal device.

Specifically, the control method may include the following steps.

101: Determine, for each of one or more carriers, low power consumption state information of the carrier based on precoding information and duration information of the carrier.

In this embodiment of the present invention, the low power consumption state information includes a target radio frequency channel and a start time and an end time for scheduling the target radio frequency channel; the target radio frequency channel is a radio frequency channel corresponding to an all-zero data sequence in a plurality of data sequences that are mapped to the plurality of radio frequency channels after precoding processing is performed on to-be-sent data of the terminal device based on the precoding information; and the start time and the end time are determined based on the duration information.

102: Send control information to the radio frequency processing module based on the low power consumption state information of each carrier, where the control information is used to control one or more of the plurality of radio frequency channels to be in a low power consumption state, and the low power consumption state includes a disabled state or a dormant state.

In an optional implementation, when there are a plurality of carriers, the sending control information to the radio frequency processing module based on the low power consumption state information of each carrier includes:

determining, based on the target radio frequency channel of each carrier and the start time and the end time for scheduling the target radio frequency channel, a duration range and a radio frequency channel corresponding to a mapped data sequence that is all-zero within scheduling duration for all the plurality of carriers; and sending the control information to the radio frequency processing module based on the duration range and the radio frequency channel corresponding to the mapped data sequence that is all-zero within the scheduling duration for all the plurality of carriers.

That the control information is used to control one or more of the plurality of radio frequency channels to be in a low power consumption state is specifically: controlling the radio frequency channel corresponding to the mapped data sequence that is all-zero within the scheduling duration for all the plurality of carriers to be in a low power consumption state within the duration range.

In another optional implementation, the sending control information to the radio frequency processing module based on the low power consumption state information of each carrier includes:

sending the control information to the radio frequency processing module based on the target radio frequency channel of the carrier and the start time and the end time for scheduling the target radio frequency channel.

That the control information is used to control one or more of the plurality of radio frequency channels to be in a low power consumption state is specifically: controlling the target radio frequency channel to be in a low power consumption state within duration from the start time to the end time.

Optionally, the terminal device further includes a digital/analog conversion module, and the digital/analog conversion module includes a plurality of digital/analog conversion units. Alternatively, if the control method is applied to a processor or a baseband processing chip, the processor or the baseband processing chip may include the digital/analog conversion module, or may not include the digital/analog conversion module. When the processor or the baseband processing chip does not include the digital/analog conversion module, the digital/analog conversion module may be disposed in a device that includes the processor or the baseband processing chip. This is not limited in this embodiment of the present invention.

Correspondingly, the low power consumption state information further includes a target digital/analog conversion unit and a start time and an end time for scheduling the target digital/analog conversion unit; the target digital/analog conversion unit is a digital/analog conversion unit corresponding to an all-zero data sequence in a plurality of data sequences that are mapped to the plurality of digital/analog conversion units after precoding processing is performed on to-be-sent data of the terminal device based on the precoding information; and the start time and the end time are determined based on the duration information.

Correspondingly, the method shown in FIG. 6 further includes the following step:

103: Send control information to the digital/analog conversion module based on the low power consumption state information of each carrier, where the control information is further used to control one or more of the plurality of digital/analog conversion units to be in a low power consumption state, and the low power consumption state includes a disabled state or a dormant state.

In an optional implementation, when there are a plurality of carriers, the sending control information to the digital/analog conversion module based on the low power consumption state information of each carrier includes:

determining, based on the target digital/analog conversion unit of each carrier and the start time and the end time for scheduling the target digital/analog conversion unit, a duration range and a digital/analog conversion unit corresponding to a mapped data sequence that is all-zero within scheduling duration for all the plurality of carriers; and sending the control information to the digital/analog conversion module based on the duration range and the digital/analog conversion unit corresponding to the mapped data sequence that is all-zero within the scheduling duration for all the plurality of carriers.

That the control information is used to control one or more of the plurality of digital/analog conversion units to be in a low power consumption state is specifically: controlling the digital/analog conversion unit corresponding to the mapped data sequence that is all-zero within the scheduling duration for all the plurality of carriers to be in a low power consumption state within the duration range.

In another optional implementation, the sending control information to the digital/analog conversion module based on the low power consumption state information of each carrier includes:

sending the control information to the digital/analog conversion module based on the target digital/analog conversion unit of the carrier and the start time and the end time for scheduling the target digital/analog conversion unit.

That the control information is used to control one or more of the plurality of digital/analog conversion units to be in a low power consumption state is specifically: controlling the target digital/analog conversion unit to be in a low power consumption state within duration from the start time to the end time.

Optionally, the terminal device further includes a resource mapping module, and the resource mapping module includes a plurality of resource mapping units. Alternatively, if the control method is applied to a processor or a baseband processing chip, the processor or the baseband processing chip may include the resource mapping module, or may not include the resource mapping module. When the processor or the baseband processing chip does not include the resource mapping module, the resource mapping module may be disposed in a device that includes the processor or the baseband processing chip. This is not limited in this embodiment of the present invention.

The low power consumption state information includes a target resource mapping unit and a start time and an end time for scheduling the target resource mapping unit; the target resource mapping unit is a resource mapping unit corresponding to an all-zero data sequence in a plurality of data sequences that are mapped to the plurality of resource mapping units after precoding processing is performed on to-be-sent data of the terminal device based on the precoding information; and the start time and the end time are determined based on the duration information.

Correspondingly, the method further includes the following step:

104: Send control information to the resource mapping module based on the low power consumption state information of each carrier.

The control information is further used to control one or more of the plurality of resource mapping units to be in a low power consumption state, and the low power consumption state includes a disabled state or a dormant state.

In an optional implementation, when there are a plurality of carriers, the sending control information to the resource mapping module based on the low power consumption state information of each carrier includes:

determining, based on the target resource mapping unit of each carrier and the start time and the end time for scheduling the target resource mapping unit, a duration range and a resource mapping unit corresponding to the mapped data sequence that is all-zero within the scheduling duration for all the plurality of carriers; and sending the control information to the resource mapping module based on the duration range and the resource mapping unit corresponding to the mapped data sequence that is all-zero within the scheduling duration for all the plurality of carriers.

That the control information is used to control one or more of the plurality of resource mapping units to be in a low power consumption state is specifically: controlling the resource mapping unit corresponding to the mapped data sequence that is all-zero within the scheduling duration for all the plurality of carriers to be in a low power consumption state within the duration range.

In another optional implementation, the sending control information to the resource mapping module based on the low power consumption state information of each carrier includes:

sending the control information to the resource mapping module based on the target resource mapping unit of the carrier and the start time and the end time for scheduling the target resource mapping unit.

That the control information is used to control one or more of the plurality of resource mapping units to be in a low power consumption state is specifically: controlling the target resource mapping unit to be in a low power consumption state within duration from the start time to the end time.

Optionally, the terminal device further includes a symbol generation module, and the symbol generation module includes a plurality of symbol generation units. Alternatively, if the control method is applied to a processor or a baseband processing chip, the processor or the baseband processing chip may include the symbol generation module, or may not include the symbol generation module. When the processor or the baseband processing chip does not include the symbol generation module, the symbol generation module may be disposed in a device that includes the processor or the baseband processing chip. This is not limited in this embodiment of the present invention.

Correspondingly, the low power consumption state information further includes a target symbol generation unit and a start time and an end time for scheduling the target symbol generation unit; the target symbol generation unit is a symbol generation unit corresponding to an all-zero data sequence in a plurality of data sequences that are mapped to the plurality of symbol generation units after precoding processing is performed on to-be-sent data of the terminal device based on the precoding information; and the start time and the end time are determined based on the duration information.

Correspondingly, the method shown in FIG. 6 further includes the following step:

105: Send control information to the symbol generation module based on the low power consumption state information of each carrier.

The control information is further used to control one or more of the plurality of symbol generation units to be in a low power consumption state, and the low power consumption state includes a disabled state or a dormant state.

In an optional implementation, when there are a plurality of carriers, the sending control information to the symbol generation module based on the low power consumption state information of each carrier includes:

determining, based on the target symbol generation unit of each carrier and the start time and the end time for scheduling the target symbol generation unit, a duration range and a symbol generation unit corresponding to the mapped data sequence that is all-zero within the scheduling duration for all the plurality of carriers; and sending the control information to the symbol generation module based on the duration range and the symbol generation unit corresponding to the mapped data sequence that is all-zero within the scheduling duration for all the plurality of carriers.

That the control information is used to control one or more of the plurality of symbol generation units to be in a low power consumption state is specifically: controlling the symbol generation unit corresponding to the mapped data sequence that is all-zero within the scheduling duration for all the plurality of carriers to be in a low power consumption state within the duration range.

In another optional implementation, the sending control information to the symbol generation module based on the low power consumption state information of each carrier includes:

sending the control information to the symbol generation module based on the target symbol generation unit of the carrier and the start time and the end time for scheduling the target symbol generation unit.

That the control information is used to control one or more of the plurality of symbol generation units to be in a low power consumption state is specifically: controlling the target symbol generation unit to be in a low power consumption state within duration from the start time to the end time.

In this embodiment of the present invention, the control information includes at least one of a switching instruction, a low power consumption control command, and low power consumption control information.

FIG. 7 is a schematic structural diagram of a control device according to an embodiment of the present invention. As shown in FIG. 7, the control device may include a determining module 201 and a sending module 202. The determining module 201 may be a baseband processing module, a baseband processing chip, or a baseband chip in the foregoing embodiments of the present invention, and the sending module 202 may be a sending interface or a sending unit of a baseband processing module, a baseband processing chip, or a baseband chip.

The determining module 201 is configured to determine, for each of one or more carriers, low power consumption state information of the carrier based on precoding information and duration information of the carrier.

The low power consumption state information includes a target radio frequency channel and a start time and an end time for scheduling the target radio frequency channel; the target radio frequency channel is a radio frequency channel corresponding to an all-zero data sequence in a plurality of data sequences that are mapped to the plurality of radio frequency channels after precoding processing is performed on to-be-sent data of the terminal device based on the precoding information; and the start time and the end time are determined based on the duration information.

The sending module 202 is configured to send control information to the radio frequency processing module based on the low power consumption state information of each carrier, where the control information is used to control one or more of the plurality of radio frequency channels to be in a low power consumption state, and the low power consumption state includes a disabled state or a dormant state.

In an optional implementation, when there are a plurality of carriers, that the sending module sends control information to the radio frequency processing module based on the low power consumption state information of each carrier is specifically:

determining, based on the target radio frequency channel of each carrier and the start time and the end time for scheduling the target radio frequency channel, a duration range and a radio frequency channel corresponding to a mapped data sequence that is all-zero within scheduling duration for all the plurality of carriers; and sending the control information to the radio frequency processing module based on the duration range and the radio frequency channel corresponding to the mapped data sequence that is all-zero within the scheduling duration for all the plurality of carriers.

That the control information is used to control one or more of the plurality of radio frequency channels to be in a low power consumption state is specifically: controlling the radio frequency channel corresponding to the mapped data sequence that is all-zero within the scheduling duration for all the plurality of carriers to be in a low power consumption state within the duration range.

In another optional implementation, that the sending module sends control information to the radio frequency processing module based on the low power consumption state information of each carrier is specifically:

sending the control information to the radio frequency processing module based on the target radio frequency channel of the carrier and the start time and the end time for scheduling the target radio frequency channel.

That the control information is used to control one or more of the plurality of radio frequency channels to be in a low power consumption state is specifically: controlling the target radio frequency channel to be in a low power consumption state within duration from the start time to the end time.

In an optional implementation, the terminal device further includes a digital/analog conversion module, and the digital/analog conversion module includes a plurality of digital/analog conversion units.

The low power consumption state information includes a target digital/analog conversion unit and a start time and an end time for scheduling the target digital/analog conversion unit; the target digital/analog conversion unit is a digital/analog conversion unit corresponding to an all-zero data sequence in a plurality of data sequences that are mapped to the plurality of digital/analog conversion units after precoding processing is performed on to-be-sent data of the terminal device based on the precoding information; and the start time and the end time are determined based on the duration information.

Correspondingly, the sending module is further configured to send control information to the digital/analog conversion module based on the low power consumption state information of each carrier, where the control information is further used to control one or more of the plurality of digital/analog conversion units to be in a low power consumption state, and the low power consumption state includes a disabled state or a dormant state.

In an optional implementation, when there are a plurality of carriers, that the sending module sends control information to the digital/analog conversion module based on the low power consumption state information of each carrier is specifically:
 determining, based on the target digital/analog conversion unit of each carrier and the start time and the end time for scheduling the target digital/analog conversion unit, a duration range and a digital/analog conversion unit corresponding to a mapped data sequence that is all-zero within scheduling duration for all the plurality of carriers; and
 sending the control information to the digital/analog conversion module based on the duration range and the digital/analog conversion unit corresponding to the mapped data sequence that is all-zero within the scheduling duration for all the plurality of carriers.

That the control information is used to control one or more of the plurality of digital/analog conversion units to be in a low power consumption state is specifically: controlling the digital/analog conversion unit corresponding to the mapped data sequence that is all-zero within the scheduling duration for all the plurality of carriers to be in a low power consumption state within the duration range.

In another optional implementation, that the sending module sends control information to the digital/analog conversion module based on the low power consumption state information of each carrier is specifically:
 sending the control information to the digital/analog conversion module based on the target digital/analog conversion unit of the carrier and the start time and the end time for scheduling the target digital/analog conversion unit.

That the control information is used to control one or more of the plurality of digital/analog conversion units to be in a low power consumption state is specifically: controlling the target digital/analog conversion unit to be in a low power consumption state within duration from the start time to the end time.

In an optional implementation, the terminal device further includes a resource mapping module, and the resource mapping module includes a plurality of resource mapping units.

The low power consumption state information includes a target resource mapping unit and a start time and an end time for scheduling the target resource mapping unit; the target resource mapping unit is a resource mapping unit corresponding to an all-zero data sequence in a plurality of data sequences that are mapped to the plurality of resource mapping units after precoding processing is performed on to-be-sent data of the terminal device based on the precoding information; and the start time and the end time are determined based on the duration information.

Correspondingly, the sending module is further configured to send control information to the resource mapping module based on the low power consumption state information of each carrier, where the control information is further used to control one or more of the plurality of resource mapping units to be in a low power consumption state, and the low power consumption state includes a disabled state or a dormant state.

In an optional implementation, when there are a plurality of carriers, that the sending module sends the control information to the resource mapping module based on the low power consumption state information of each carrier is specifically:
 determining, based on the target resource mapping unit of each carrier and the start time and the end time for scheduling the target resource mapping unit, a duration range and a resource mapping unit corresponding to the mapped data sequence that is all-zero within the scheduling duration for all the plurality of carriers; and
 sending the control information to the resource mapping module based on the duration range and the resource mapping unit corresponding to the mapped data sequence that is all-zero within the scheduling duration for all the plurality of carriers.

That the control information is used to control one or more of the plurality of resource mapping units to be in a low power consumption state is specifically: controlling the resource mapping unit corresponding to the mapped data sequence that is all-zero within the scheduling duration for all the plurality of carriers to be in a low power consumption state within the duration range.

In another optional implementation, that the sending module sends the control information to the resource mapping module based on the low power consumption state information of each carrier is specifically:
 sending the control information to the resource mapping module based on the target resource mapping unit of the carrier and the start time and the end time for scheduling the target resource mapping unit.

That the control information is used to control one or more of the plurality of resource mapping units to be in a low power consumption state is specifically: controlling the target resource mapping unit to be in a low power consumption state within duration from the start time to the end time.

In an optional implementation, the terminal device further includes a symbol generation module, and the symbol generation module includes a plurality of symbol generation units.

The low power consumption state information includes a target symbol generation unit and a start time and an end time for scheduling the target symbol generation unit; the target symbol generation unit is a symbol generation unit corresponding to an all-zero data sequence in a plurality of data sequences that are mapped to the plurality of symbol generation units after precoding processing is performed on to-be-sent data of the terminal device based on the precoding information; and the start time and the end time are determined based on the duration information.

Correspondingly, the sending module is further configured to send control information to the symbol generation module based on the low power consumption state information of each carrier.

The control information is further used to control one or more of the plurality of symbol generation units to be in a low power consumption state, and the low power consumption state includes a disabled state or a dormant state.

In an optional implementation, when there are a plurality of carriers, that the sending module sends the control information to the symbol generation module based on the low power consumption state information of each carrier is specifically:

determining, based on the target symbol generation unit of each carrier and the start time and the end time for scheduling the target symbol generation unit, a duration range and a symbol generation unit corresponding to the mapped data sequence that is all-zero within the scheduling duration for all the plurality of carriers; and sending the control information to the symbol generation module based on the duration range and the symbol generation unit corresponding to the mapped data sequence that is all-zero within the scheduling duration for all the plurality of carriers.

That the control information is used to control one or more of the plurality of symbol generation units to be in a low power consumption state is specifically: controlling the symbol generation unit corresponding to the mapped data sequence that is all-zero within the scheduling duration for all the plurality of carriers to be in a low power consumption state within the duration range.

In another optional implementation, that the sending module sends the control information to the symbol generation module based on the low power consumption state information of each carrier is specifically:

sending the control information to the symbol generation module based on the target symbol generation unit of the carrier and the start time and the end time for scheduling the target symbol generation unit.

That the control information is used to control one or more of the plurality of symbol generation units to be in a low power consumption state is specifically: controlling the target symbol generation unit to be in a low power consumption state within duration from the start time to the end time.

In this embodiment of the present invention, the control information includes at least one of a switching instruction, a low power consumption control command, and low power consumption control information.

FIG. 8 is a schematic structural diagram of another control device according to an embodiment of the present invention. As shown in FIG. 8, the device may be a chip or a circuit, for example, a chip or a circuit that may be disposed in a terminal device. The terminal device may include at least one of the radio frequency processing module, the resource mapping module, the digital/analog conversion module, and the symbol generation module described above.

The control device may include a processor 110 and a memory 120. The memory 120 is configured to store an instruction, and the processor 110 is configured to execute the instruction stored in the memory 120, to implement the control method described in the foregoing embodiment.

The device may further include a receiver 140 and a transmitter 150. The device may further include a bus system 130. The processor 110, the memory 120, the receiver 140, and the transmitter 150 may be connected through the bus system 130.

The processor 110 is configured to execute the instruction stored in the memory 120, to control the receiver 140 to receive a signal and control the transmitter 150 to send a signal. The receiver 140 and the transmitter 150 may be a same physical entity or different physical entities. When being a same physical entity, the receiver 140 and the transmitter 150 may be collectively referred to as a transceiver. The memory 120 may be integrated into the processor 110, or may be disposed separately from the processor 110.

In an implementation, it may be considered that functions of the receiver 140 and the transmitter 150 are implemented through a transceiver circuit or a dedicated transceiver chip. It may be considered that the processor 110 is implemented through a dedicated processing chip, a processing circuit, a processor, or a general-purpose chip. Optionally, the processor 110 may be a baseband processing chip or a baseband processing module.

In an optional implementation, the processor 110 may invoke the executable instruction in the memory 120 to perform the following steps:

determining, for each of one or more carriers, low power consumption state information of the carrier based on precoding information and duration information of the carrier, where the low power consumption state information includes a target radio frequency channel and a start time and an end time for scheduling the target radio frequency channel; the target radio frequency channel is a radio frequency channel corresponding to an all-zero data sequence in a plurality of data sequences that are mapped to the plurality of radio frequency channels after precoding processing is performed on to-be-sent data of the terminal device based on the precoding information; and the start time and the end time are determined based on the duration information; and sending control information to the radio frequency processing module based on the low power consumption state information of each carrier, where the control information is used to control one or more of the plurality of radio frequency channels to be in a low power consumption state, and the low power consumption state includes a disabled state or a dormant state.

In an optional implementation, when there are a plurality of carriers, that the processor 110 sends control information to the radio frequency processing module based on the low power consumption state information of each carrier is specifically:

determining, based on the target radio frequency channel of each carrier and the start time and the end time for scheduling the target radio frequency channel, a duration range and a radio frequency channel corresponding to a mapped data sequence that is all-zero within scheduling duration for all the plurality of carriers; and sending the control information to the radio frequency processing module based on the duration range and the radio frequency channel corresponding to the mapped data sequence that is all-zero within the scheduling duration for all the plurality of carriers.

That the control information is used to control one or more of the plurality of radio frequency channels to be in a low power consumption state is specifically: controlling the radio frequency channel corresponding to the mapped data sequence that is all-zero within the scheduling duration for all the plurality of carriers to be in a low power consumption state within the duration range.

In another optional implementation, that the processor 110 sends control information to the radio frequency processing module based on the low power consumption state information of each carrier is specifically:

sending the control information to the radio frequency processing module based on the target radio frequency channel of the carrier and the start time and the end time for scheduling the target radio frequency channel.

That the control information is used to control one or more of the plurality of radio frequency channels to be in a low power consumption state is specifically: controlling the target radio frequency channel to be in a low power consumption state within duration from the start time to the end time.

Optionally, the low power consumption state information includes a target digital/analog conversion unit and a start time and an end time for scheduling the target digital/analog conversion unit; the target digital/analog conversion unit is a digital/analog conversion unit corresponding to an all-zero data sequence in a plurality of data sequences that are mapped to the plurality of digital/analog conversion units after precoding processing is performed on to-be-sent data of the terminal device based on the precoding information; and the start time and the end time are determined based on the duration information.

Correspondingly, the processor 110 may invoke the executable instruction in the memory 120 to perform the following step:

sending control information to the digital/analog conversion module based on the low power consumption state information of each carrier, where the control information is further used to control one or more of the plurality of digital/analog conversion units to be in a low power consumption state, and the low power consumption state includes a disabled state or a dormant state.

In an optional implementation, when there are a plurality of carriers, that the processor 110 sends control information to the digital/analog conversion module based on the low power consumption state information of each carrier is specifically:

determining, based on the target digital/analog conversion unit of each carrier and the start time and the end time for scheduling the target digital/analog conversion unit, a duration range and a digital/analog conversion unit corresponding to a mapped data sequence that is all-zero within scheduling duration for all the plurality of carriers; and sending the control information to the digital/analog conversion module based on the duration range and the digital/analog conversion unit corresponding to the mapped data sequence that is all-zero within the scheduling duration for all the plurality of carriers.

That the control information is used to control one or more of the plurality of digital/analog conversion units to be in a low power consumption state is specifically: controlling the digital/analog conversion unit corresponding to the mapped data sequence that is all-zero within the scheduling duration for all the plurality of carriers to be in a low power consumption state within the duration range.

In another optional implementation, that the processor 110 sends control information to the digital/analog conversion module based on the low power consumption state information of each carrier is specifically:

sending the control information to the digital/analog conversion module based on the target digital/analog conversion unit of the carrier and the start time and the end time for scheduling the target digital/analog conversion unit.

That the control information is used to control one or more of the plurality of digital/analog conversion units to be in a low power consumption state is specifically: controlling the target digital/analog conversion unit to be in a low power consumption state within duration from the start time to the end time.

Optionally, the terminal device further includes a resource mapping module, and the resource mapping module includes a plurality of resource mapping units. The low power consumption state information includes a target resource mapping unit and a start time and an end time for scheduling the target resource mapping unit; the target resource mapping unit is a resource mapping unit corresponding to an all-zero data sequence in a plurality of data sequences that are mapped to the plurality of resource mapping units after precoding processing is performed on to-be-sent data of the terminal device based on the precoding information; and the start time and the end time are determined based on the duration information.

Correspondingly, the processor 110 may invoke the executable instruction in the memory 120, to perform the following step:

sending control information to the resource mapping module based on the low power consumption state information of each carrier.

The control information is further used to control one or more of the plurality of resource mapping units to be in a low power consumption state, and the low power consumption state includes a disabled state or a dormant state.

In an optional implementation, when there are a plurality of carriers, that the processor 110 sends the control information to the resource mapping module based on the low power consumption state information of each carrier is specifically:

determining, based on the target resource mapping unit of each carrier and the start time and the end time for scheduling the target resource mapping unit, a duration range and a resource mapping unit corresponding to the mapped data sequence that is all-zero within the scheduling duration for all the plurality of carriers; and sending the control information to the resource mapping module based on the duration range and the resource mapping unit corresponding to the mapped data sequence that is all-zero within the scheduling duration for all the plurality of carriers.

That the control information is used to control one or more of the plurality of resource mapping units to be in a low power consumption state is specifically: controlling the resource mapping unit corresponding to the mapped data sequence that is all-zero within the scheduling duration for all the plurality of carriers to be in a low power consumption state within the duration range.

In an optional implementation, that the processor 110 sends the control information to the resource mapping module based on the low power consumption state information of each carrier is specifically:

sending the control information to the resource mapping module based on the target resource mapping unit of the carrier and the start time and the end time for scheduling the target resource mapping unit.

That the control information is used to control one or more of the plurality of resource mapping units to be in a low power consumption state is specifically: controlling the target resource mapping unit to be in a low power consumption state within duration from the start time to the end time.

Optionally, the terminal device further includes a symbol generation module, and the symbol generation module includes a plurality of symbol generation units. The low power consumption state information includes a target symbol generation unit and a start time and an end time for scheduling the target symbol generation unit; the target symbol generation unit is a symbol generation unit corresponding to an all-zero data sequence in a plurality of data sequences that are mapped to the plurality of symbol generation units after precoding processing is performed on to-be-sent data of the terminal device based on the precoding information; and the start time and the end time are determined based on the duration information.

Correspondingly, the processor 110 may invoke the executable instruction in the memory 120 to perform the following step:

sending control information to the symbol generation module based on the low power consumption state information of each carrier.

The control information is further used to control one or more of the plurality of symbol generation units to be in a low power consumption state, and the low power consumption state includes a disabled state or a dormant state.

In an optional implementation, when there are a plurality of carriers, that the processor 110 sends the control information to the symbol generation module based on the low power consumption state information of each carrier is specifically:

determining, based on the target symbol generation unit of each carrier and the start time and the end time for scheduling the target symbol generation unit, a duration range and a symbol generation unit corresponding to the mapped data sequence that is all-zero within the scheduling duration for all the plurality of carriers; and sending the control information to the symbol generation module based on the duration range and the symbol generation unit corresponding to the mapped data sequence that is all-zero within the scheduling duration for all the plurality of carriers.

That the control information is used to control one or more of the plurality of symbol generation units to be in a low power consumption state is specifically: controlling the symbol generation unit corresponding to the mapped data sequence that is all-zero within the scheduling duration for all the plurality of carriers to be in a low power consumption state within the duration range.

In another optional implementation, that the processor 110 sends the control information to the symbol generation module based on the low power consumption state information of each carrier is specifically:

sending the control information to the symbol generation module based on the target symbol generation unit of the carrier and the start time and the end time for scheduling the target symbol generation unit.

That the control information is used to control one or more of the plurality of symbol generation units to be in a low power consumption state is specifically: controlling the target symbol generation unit to be in a low power consumption state within duration from the start time to the end time.

In this embodiment of the present invention, the control information includes at least one of a switching instruction, a low power consumption control command, and low power consumption control information.

All or some of the foregoing embodiments may be implemented through software, hardware, firmware, or any combination thereof. When a software program is used to implement the embodiments, the embodiments may be implemented all or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL for short)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD for short)), or the like. Although this application is described with reference to the embodiments, in a process of implementing this application that claims protection, a person skilled in the art may understand and implement another variation of the disclosed embodiments by viewing the accompanying drawings, the disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect. Although this application is described with reference to specific features and the embodiments thereof, it is clear that various modifications and combinations may be made to them without departing from the spirit and scope of this application. Correspondingly, this specification and the accompanying drawings are merely example description of this application defined by the appended claims, and is considered as any of or all modifications, variations, combinations or equivalents that cover the scope of this application. Obviously, a person skilled in the art can make various modifications and variations to this application without departing from the spirit and scope of this application. If these modifications and variations of this application fall within the scope of the claims of this application and their equivalent technologies, this application is also intended to cover these modifications and variations.

What is claimed is:

1. A control method for a terminal device, wherein the terminal device comprises at least one processor and a radio frequency processing circuit, wherein the radio frequency processing circuit comprises a plurality of radio frequency channels, and wherein the method comprises:

determining by the at least one processor, for each of one or more carriers, low power consumption state information of the carrier based on precoding information and duration information of the carrier, wherein the low power consumption state information comprises a target radio frequency channel and a duration time for scheduling the target radio frequency channel, wherein the target radio frequency channel is a radio frequency channel of the plurality of radio frequency channels, and wherein a data sequence mapped to the target radio frequency channel is all-zero; and sending control information to the radio frequency processing circuit based on the low power consumption state information of each carrier, wherein the control information is used to control the target radio frequency channel to be in a low power consumption state, and wherein the low power consumption state comprises a disabled state or a dormant state.

2. The method according to claim 1, wherein when there are a plurality of carriers, the sending control information to the radio frequency processing circuit based on the low power consumption state information of each carrier comprises:

determining, based on the target radio frequency channel of each carrier and the duration time for scheduling the target radio frequency channel, a duration range and a second target radio frequency channel, wherein the second target radio frequency channel corresponds to a mapped data sequence that is all-zero within scheduling duration for all the plurality of carriers; and sending the control information to the radio frequency processing circuit based on the duration range and the second target radio frequency channel, wherein the control information is used to control the second target radio frequency channel to be in a low power consumption state within the duration range.

3. The method according to claim 1, wherein the sending control information to the radio frequency processing circuit based on the low power consumption state information of each carrier comprises:

sending the control information to the radio frequency processing circuit based on the target radio frequency channel of the carrier and the duration time for scheduling the target radio frequency channel, wherein the control information is used to control the target radio frequency channel to be in a low power consumption state within the duration time.

4. The method according to claim 1, wherein the terminal device further comprises a digital to analog converter, and wherein the digital to analog converter comprises a plurality of digital to analog converter units;

wherein the low power consumption state information further comprises a target digital to analog converter unit and a duration time for scheduling the target digital to analog converter unit, wherein the target digital to analog converter unit is a digital to analog converter unit of a plurality of digital to analog converter units, and wherein a data sequence mapped to the target digital to analog converter unit is all-zero; and wherein the method further comprises:

sending control information to the digital to analog converter based on the low power consumption state information of each carrier, wherein the control information is used to control the target digital to analog converter units to be in a low power consumption state, and wherein the low power consumption state comprises a disabled state or a dormant state.

5. The method according to claim 4, wherein when there are a plurality of carriers, the sending control information to the digital to analog converter based on the low power consumption state information of each carrier comprises:

determining, based on the target digital to analog converter of each carrier and the duration time for scheduling the target digital to analog converter unit, a duration range and a second target digital to analog converter unit, wherein the second target digital to analog converter unit corresponds to a mapped data sequence that is all-zero within scheduling duration for all the plurality of carriers; and sending the control information to the digital to analog converter based on the duration range and the second target digital to analog converter unit, wherein the control information is used to control the second target digital to analog converter unit to be in a low power consumption state within the duration range.

6. The method according to claim 4, wherein the sending control information to the digital to analog converter based on the low power consumption state information of each carrier comprises:

sending the control information to the digital to analog converter based on the target digital to analog converter unit of the carrier and the duration time for scheduling the target digital to analog converter unit, wherein the control information is used to control the target digital to analog converter unit to be in a low power consumption state within the duration time.

7. The method according to claim 1, wherein the control information comprises at least one of a switching instruction, a low power consumption control command, or low power consumption control information.

8. A terminal device, wherein the terminal device comprises a control device and a radio frequency processing circuit, and wherein the control device comprises:

at least one processor; and one or more memories coupled to the at least one processor and storing programming instructions for execution by the at least one processor to:

determine, for each of one or more carriers, low power consumption state information of the carrier based on precoding information and duration information of the carrier, wherein the low power consumption state information comprises a target radio frequency channel and a duration time for scheduling the target radio frequency channel, wherein the target radio frequency channel is a radio frequency channel of the radio frequency processing circuit in the terminal device, and wherein a data sequence mapped to the target radio frequency channel is all-zero; and send control information to the radio frequency processing circuit based on the low power consumption state information of each carrier, wherein the control information is used to control the target radio frequency channel to be in a low power consumption state, and wherein the low power consumption state comprises a disabled state or a dormant state.

9. The terminal device according to claim 8, wherein when there are a plurality of carriers, the programming instructions are for execution by the at least one processor to:

determine, based on the target radio frequency channel of each carrier and the duration time for scheduling the target radio frequency channel, a duration range and a second target radio frequency channel, wherein the second target radio frequency channel corresponds to a mapped data sequence that is all-zero within scheduling duration for all the plurality of carriers; and send the control information to the radio frequency processing circuit based on the duration range and the second target radio frequency channel, wherein the control information is used to control the second target radio frequency channel to be in a low power consumption state within the duration range.

10. The terminal device according to claim 8, wherein the programming instructions are for execution by the at least one processor to:
send the control information to the radio frequency processing circuit based on the target radio frequency channel of the carrier and the duration time for scheduling the target radio frequency channel, wherein the control information is used to control the target radio frequency channel to be in a low power consumption state within the duration time.

11. The terminal device according to claim 8, wherein:
the terminal device further comprises a digital to analog converter, and the digital to analog converter comprises a plurality of digital to analog converter units;
the low power consumption state information further comprises a target digital to analog converter unit and a duration time for scheduling the target digital to analog converter unit, the target digital to analog converter unit is a digital to analog converter unit of a plurality of digital to analog converter units, and a data sequence mapped to the target digital to analog converter unit is all-zero; and
the programming instructions are for execution by the at least one processor to:
send control information to the digital to analog converter based on the low power consumption state information of each carrier, wherein the control information is used to control the target digital to analog converter units to be in a low power consumption state, and wherein the low power consumption state comprises a disabled state or a dormant state.

12. The terminal device according to claim 11, wherein when there are a plurality of carriers, the programming instructions are for execution by the at least one processor to:
determine, based on the target digital to analog converter of each carrier and the duration time for scheduling the target digital to analog converter unit, a duration range and a second target digital to analog converter unit, wherein the second target digital to analog converter unit corresponds to a mapped data sequence that is all-zero within scheduling duration for all the plurality of carriers; and
send the control information to the digital to analog converter based on the duration range and the second target digital to analog converter unit, wherein the control information is used to control the second target digital to analog converter unit to be in a low power consumption state within the duration range.

13. The terminal device according to claim 11, wherein the programming instructions are for execution by the at least one processor to:
send the control information to the digital to analog converter based on the target digital to analog converter unit of the carrier and the duration time for scheduling the target digital to analog converter unit, wherein the control information is used to control the target digital to analog converter unit to be in a low power consumption state within the duration time.

14. He terminal device according to claim 8, wherein the control information comprises at least one of a switching instruction, a low power consumption control command, or low power consumption control information.

15. A computer program product, comprising computer executable instructions stored on a non-transitory computer-readable medium, wherein when the instructions are executed by at least one processor, causes the at least one processor to:
determine, for each of one or more carriers, low power consumption state information of the carrier based on precoding information and duration information of the carrier, wherein the low power consumption state information comprises a target radio frequency channel and a duration time for scheduling the target radio frequency channel, wherein the target radio frequency channel is a radio frequency channel of a radio frequency processing circuit in a terminal device, and wherein a data sequence mapped to the target radio frequency channel is all-zero; and
send control information to the radio frequency processing circuit based on the low power consumption state information of each carrier, wherein the control information is used to control the target radio frequency channel to be in a low power consumption state, and wherein the low power consumption state comprises a disabled state or a dormant state.

16. The computer program product according to claim 15, wherein when there are a plurality of carriers, the instructions are executed by the at least one processor to:
determine, based on the target radio frequency channel of each carrier and the duration time for scheduling the target radio frequency channel, a duration range and a second target radio frequency channel, wherein the second target radio frequency channel corresponds to a mapped data sequence that is all-zero within scheduling duration for all the plurality of carriers; and
send the control information to the radio frequency processing circuit based on the duration range and the second target radio frequency channel, wherein the control information is used to control the second target radio frequency channel to be in a low power consumption state within the duration range.

17. The computer program product according to claim 15, wherein when there are a plurality of carriers, the instructions are executed by the at least one processor to:
send the control information to the radio frequency processing circuit based on the target radio frequency channel of the carrier and the duration time for scheduling the target radio frequency channel, wherein the control information is used to control the target radio frequency channel to be in a low power consumption state within the duration time.

18. The computer program product according to claim 15, wherein:
the terminal device further comprises a digital to analog converter, and the digital to analog converter comprises a plurality of digital to analog converter units;
the low power consumption state information further comprises a target digital to analog converter unit and a duration time for scheduling the target digital to analog converter unit, the target digital to analog converter unit is a digital to analog converter unit of a plurality of digital to analog converter units, and a data sequence mapped to the target digital to analog converter unit is all-zero; and
the instructions are executed by the at least one processor to:
send control information to the digital to analog converter based on the low power consumption state information of each carrier, wherein the control information is used to control the target digital to analog converter units to be in a low power consumption state, and wherein the low power consumption state comprises a disabled state or a dormant state.

19. The computer program product according to claim 18, wherein when there are a plurality of carriers, the instructions are executed by the at least one processor to:
- determine, based on the target digital to analog converter of each carrier and the duration time for scheduling the target digital to analog converter unit, a duration range and a second target digital to analog converter unit, wherein the second target digital to analog converter unit corresponds to a mapped data sequence that is all-zero within scheduling duration for all the plurality of carriers; and
- send the control information to the digital to analog converter based on the duration range and the second target digital to analog converter unit, wherein the control information is used to control the second target digital to analog converter unit to be in a low power consumption state within the duration range.

20. The computer program product according to claim 18, wherein the instructions are executed by the at least one processor to:
- send the control information to the digital to analog converter based on the target digital to analog converter unit of the carrier and the duration time for scheduling the target digital to analog converter unit, wherein the control information is used to control the target digital to analog converter unit to be in a low power consumption state within the duration time.

* * * * *

UNITED STATES PATENT AND TRADEMARK OFFICE
CERTIFICATE OF CORRECTION

PATENT NO. : 11,516,734 B2
APPLICATION NO. : 17/186836
DATED : November 29, 2022
INVENTOR(S) : Junwei Wang and Meng Deng It is certified that error appears in the above-identified patent and that said Letters Patent is hereby corrected as shown below:

In the Claims

Column 47/Line 62 - In Claim 14, delete "He" and insert -- The --.

Signed and Sealed this
Twenty-fifth Day of April, 2023

Katherine Kelly Vidal
*Director of the United States Patent and Trademark Office*